United States Patent
Beckett et al.

(10) Patent No.: US 10,268,525 B2
(45) Date of Patent: Apr. 23, 2019

(54) SYSTEM AND METHOD FOR NON-PROGRAMMATICALLY CONSTRUCTING SOFTWARE SOLUTIONS

(71) Applicant: Pegasystems Inc., Cambridge, MA (US)

(72) Inventors: Stephen Marshall Beckett, Woodstock, GA (US); Antony J. Castagno, Roswell, GA (US); Damon Gerard Lockwood, Decatur, GA (US); Horace Daniel McDougald, Canton, GA (US)

(73) Assignee: Pegasystems Inc., Cambridge, MA (US)

(*) Notice: Subject to any disclaimer, the term of this patent is extended or adjusted under 35 U.S.C. 154(b) by 11 days.

(21) Appl. No.: 15/692,311

(22) Filed: Aug. 31, 2017

(65) Prior Publication Data
US 2018/0129545 A1    May 10, 2018

Related U.S. Application Data

(63) Continuation of application No. 11/305,060, filed on Dec. 16, 2005, now Pat. No. 9,766,953.
(Continued)

(51) Int. Cl.
*G06F 8/34* (2018.01)
*G06F 9/54* (2006.01)

(52) U.S. Cl.
CPC .............. *G06F 9/541* (2013.01); *G06F 8/34* (2013.01)

(58) Field of Classification Search
CPC ...... G06F 8/24; G06F 8/30; G06F 8/33–8/36; G06F 8/74; G06F 8/75; G06F 9/541
(Continued)

(56) References Cited

U.S. PATENT DOCUMENTS

| 4,860,204 A | 8/1989 | Gendron et al. |
| 5,206,951 A | 4/1993 | Khoyi et al. |

(Continued)

FOREIGN PATENT DOCUMENTS

| WO | WO 2005/076130 | 8/2005 |
| WO | WO 2007/007017 | 1/2007 |

OTHER PUBLICATIONS

Landauer, C. "Integrated Software Environments", Proceedings of the 8th Conf. on Artificial . . ., 1992 <http://ieexplore.ieee.org/document/200025/>, pp. 164-170.
(Continued)

*Primary Examiner* — Todd Aguilera
(74) *Attorney, Agent, or Firm* — Smith, Gambrell & Russell, LLP

(57) ABSTRACT

A visual software development system in which a user can graphically build a design or software solution without having to write software code includes one or more adapters that interrogate interfaces of the software platform that a software system or systems is built in accordance with and generate descriptions that the user can then incorporate into the design. The software systems can be of disparate technology platforms, an adapter provided that suits each platform. The descriptions can be represented graphically for the user with icons in an integrated development environment (IDE), and the user can build the design by dragging or otherwise selecting descriptions to be used and connecting them together to graphically represent the flow of information or communication of events among the descriptions.

18 Claims, 21 Drawing Sheets

Related U.S. Application Data

(60) Provisional application No. 60/636,703, filed on Dec. 16, 2004.

(58) Field of Classification Search
USPC ......... 717/100–121, 162–167; 719/328–329; 715/763
See application file for complete search history.

(56) References Cited

U.S. PATENT DOCUMENTS

| | | |
|---|---|---|
| 5,724,589 A | 3/1998 | Wold |
| 5,742,848 A | 4/1998 | Burgess |
| 5,781,720 A | 7/1998 | Parker et al. |
| 5,815,711 A | 9/1998 | Sakamoto et al. |
| 5,850,548 A | 12/1998 | Williams |
| 5,862,372 A | 1/1999 | Morris et al. |
| 5,867,707 A | 2/1999 | Nishida et al. |
| 5,872,973 A | 2/1999 | Mitchell et al. |
| 5,911,070 A | 6/1999 | Solton et al. |
| 5,915,113 A | 6/1999 | McDonald et al. |
| 5,987,246 A | 11/1999 | Thomsen et al. |
| 6,046,740 A | 4/2000 | LaRoche et al. |
| 6,141,698 A | 10/2000 | Krishnan et al. |
| 6,154,875 A | 11/2000 | Tanaka et al. |
| 6,182,160 B1 | 1/2001 | Burgess |
| 6,308,146 B1 | 10/2001 | Cascia, Jr. et al. |
| 6,317,143 B1 | 11/2001 | Wugofski |
| 6,425,120 B1 | 7/2002 | Morganelli et al. |
| 6,425,121 B1 | 7/2002 | Phillips |
| 6,437,805 B1 | 8/2002 | Sojoodi et al. |
| 6,453,356 B1 | 9/2002 | Sheard et al. |
| 6,490,719 B1 | 12/2002 | Thomas |
| 6,526,566 B1 | 2/2003 | Austin |
| 6,564,368 B1 | 5/2003 | Beckett et al. |
| 6,611,878 B2 | 8/2003 | De Armas et al. |
| 6,701,513 B1 | 3/2004 | Bailey |
| 6,766,475 B2 | 7/2004 | Segal et al. |
| 6,836,780 B1 | 12/2004 | Opitz et al. |
| 6,854,089 B1 | 2/2005 | Santee et al. |
| 6,874,149 B1 | 3/2005 | Bermudez et al. |
| 6,898,764 B2 | 5/2005 | Kemp |
| 6,915,513 B2 | 7/2005 | Duesterwald et al. |
| 6,976,222 B2 | 12/2005 | Sojoodi et al. |
| 7,100,172 B2 | 8/2006 | Voellm et al. |
| 7,120,876 B2 | 10/2006 | Washington et al. |
| 7,120,877 B2 | 10/2006 | Gabbert et al. |
| 7,240,328 B2 | 7/2007 | Beckett et al. |
| 7,272,819 B2 | 9/2007 | Seto et al. |
| 8,099,736 B2 | 1/2012 | Hoerle et al. |
| 2001/0045965 A1 | 11/2001 | Orbanes et al. |
| 2001/0052110 A1 | 12/2001 | Orbanes et al. |
| 2002/0089541 A1 | 7/2002 | Orbanes et al. |
| 2002/0108101 A1 | 8/2002 | Charisius et al. |
| 2002/0199034 A1 | 12/2002 | Beckett et al. |
| 2004/0015858 A1 | 1/2004 | Seto et al. |
| 2004/0078105 A1 | 4/2004 | Moon et al. |
| 2004/0128644 A1 | 7/2004 | Hurst et al. |
| 2004/0205706 A1 | 10/2004 | Portwood |
| 2006/0085796 A1 | 4/2006 | Hoerle et al. |
| 2008/0222618 A1 | 9/2008 | Valtchev |

OTHER PUBLICATIONS

Schmelzer, R., rachetSoft Championing the Concept . . ., 2003 <http://rachetsoft.com/papers/Rachetsoft-122003-ZTZN-1136.pdf.> pp. 1-5.

<Dictionary>
<System>
<Windows>
<Forms>
<TextBox>
<Method>
<AppendText />
<SetBounds />
</Method>
<Property>
<Text />
<TextAlign />
</Property>
<Event>
<TextChanged />
<KeyDown />
</Event>
</TextBox>
<Button>
<Event>
<MouseDown />
</Event>
</Button>
</Forms>
</Windows>
</System>
</Dictionary>

Figure 20

```
<OpenSpanDesignDocument Version="1.3">
  <ComponentInfo>
    <DesignName Value="DesignForm" />
    <Type Value="OpenSpan.Design.DesignForm" />
    <Assembly Value="OpenSpan, Version=1.0.0.0, Culture=neutral, PublicKeyToken=null" />
    <AssemblyReferences>
      <Assembly Value="System.Configuration.Install, Version=1.0.5000.0, Culture=neutral, PublicKeyToken=b03f5f7f11d50a3a" />
      <Assembly Value="System.Xml, Version=1.0.5000.0, Culture=neutral, PublicKeyToken=b77a5c561934e089" />
      <Assembly Value="System, Version=1.0.5000.0, Culture=neutral, PublicKeyToken=b77a5c561934e089" />
      <Assembly Value="System.Drawing, Version=1.0.5000.0, Culture=neutral, PublicKeyToken=b03f5f7f11d50a3a" />
      <Assembly Value="OpenSpan, Version=2.0.0.0, Culture=neutral, PublicKeyToken=null" />
      <Assembly Value="System.Design, Version=1.0.5000.0, Culture=neutral, PublicKeyToken=b03f5f7f11d50a3a" />
      <Assembly Value="System.Windows.Forms, Version=1.0.5000.0, Culture=neutral, PublicKeyToken=b77a5c561934e089" />
      <Assembly Value="OpenSpan.Transform, Version=2.0.0.0, Culture=neutral, PublicKeyToken=null" />
    </AssemblyReferences>
    <DesignComponentReferences />
  </ComponentInfo>
  <Component Version="1.3">
    <OpenSpan.Design.DesignForm Name="DesignForm">
      <Text Value="Design Form" />
      <DesignName Value="DesignForm" />
      <ClientSize Value="293, 366" />
      <BackColor Value="Control" />
      <AutoScaleBaseSize Value="5, 13" />
      <IsStartStoppable Value="True" />
      <Id Value="DesignForm-8C7C69E3AF90380" />
      <Location Value="13, 13" />
      <Content Name="DockPadding">
        <System.Windows.Forms.ScrollableControl_x002B_DockPaddingEdges />
      </Content>
      <Content Name="DataBindings">
        <System.Windows.Forms.ControlBindingsCollection />
      </Content>
    </OpenSpan.Design.DesignForm>
  </Component>
</OpenSpanDesignDocument>
```

Figure 21

SYSTEM AND METHOD FOR NON-PROGRAMMATICALLY CONSTRUCTING SOFTWARE SOLUTIONS

CROSS-REFERENCE TO RELATED APPLICATIONS

The present application is a continuation of U.S. application Ser. No. 11/305,060, filed Dec. 16, 2005, now U.S. Pat. No. 9,766,953, issued Sep. 19, 2017, which claims the benefit of U.S. Provisional Application No. 60/636,703, filed Dec. 16, 2004.

BACKGROUND OF THE INVENTION

Field of the Invention

The present invention relates generally to graphical programming and visual software development and, more specifically, to building solutions integrating disparate software systems without programming.

Description of the Related Art

In 1968, Doug McIlroy, a noted computer scientist, wrote: "Follow the lead of hardware design! It is not right that every new development should start from scratch. There should be catalogs of software modules, as there are catalogs of VLSI devices: when we build a new system, we should be ordering components from these catalogs and combining them, rather than reinventing the wheel every time. We would write less software, and perhaps do a better job at which we do get to write."

Creating software is generally known to be technically challenging, time consuming, and expensive. Enterprise software products and solutions can have thousands of objects and source code modules. Electronic circuit design can be equally challenging. Central processing units (CPUs) may contain millions of microscopic devices. Electronic design has been greatly simplified by assembling pre-existing components using Computer Aided Design (CAD) software.

Software packages for graphical electronic design are widely commercially available. Such a package may include various windows and browsers in which elements of the package are operated. One such element may provide a hierarchical view of components used in the solution. This can include their identity, and containment relationships. Another such element can provide a graphical view of the solution under design, illustrating the physical layout of components and the logical arrangement of an algorithm as expressed as data and control flow between components. Another element can provide a display of a currently selected component's attributes. There can also be a toolbox that provides a display of available components that can be placed on the design surface as part of the circuit assembly process. Using these elements, a circuit designer can graphically select components, place them in any desired arrangement and interconnect them to define a design. Software packages that include electronic CAD features may also compile the design and output a netlist. A netlist describes the connectivity of an electronic design and is used during the fabrication of integrated circuits. With modern circuits having millions of microscopic components, utilizing an electronic CAD package during design has become mandatory.

Software tools are becoming more and more similar to the CAD tools used in circuit design. The Integrated Development Environment (IDE) has become the standard foundation for modern Rapid Application Development (RAD) tools, and is remarkably similar to electronic CAD tools. Examples of software IDEs include Borland Software Corporation's DELPHI® and JBUILDER®, Sybase Inc.'s POWERBUILDER®, Microsoft Corporation's VISUAL BASIC® and MICROSOFT VISUAL STUDIO®, IBM Corporation's VISUAL AID®, and many others.

As illustrated in FIG. 2 Microsoft's VISUAL STUDIO® IDE includes a number of graphical elements. The Design Surface 201 is where objects can be assembled into a new software application, library, or service. The Solution Explorer 202 is a hierarchical explorer of the objects and software deliverables that comprise the solution. The Toolbox 203 contains a catalog of reusable objects that can be dragged onto a design surface to facilitate the assembly. The Property Grid 204 that shows and allows the manipulation of the property values of the currently selected object. The Source Code 205 editor for programmers to write source code, and may also show the source code that is generated in response to user manipulation of the properties of objects with the property grid, and the placing of additional objects from the toolbox onto a design surface. A Compiler consumes the source code created within the environment, both by programmers and generated by the IDE, in order to produce the modules that comprise a new software program.

The typical IDEs' graphical designers are usually limited to the creation of the Graphical User Interface (GUI). Unlike Electronic CAD, typical IDEs require programmers to author source code to define the software's algorithms.

More recent IDEs have included the ability to define integration and logic algorithms graphically in a manner similar to Electronic CAD. Known as "Visual Programming", these tools use a graphical diagram where nodes are visually connected. The nodes may represent a variable, a function, an object, or an operator. These tools may generate source code that is compiled, or a script that is interpreted. Visual Programming is known to greatly reduce the time and complexity of software construction. National Instruments Corporation's LABVIEW® is an example of a well-known Visual Programming environment utilized in the instrumentation and measurement market.

Application Integration tools enable the construction of new software solutions that integrate existing software systems. These tools are known to use Connectors, also known as Drivers or Adapters, to provide software routines for intelligent interaction with existing software systems. Connectors provide a common Application Program Interface (API) that maps to an existing system's "Open" APIs. Open is the term generally used to mean "for public use." For this definition, API may include a software system's data stores. Open APIs may be software system specific, such as for Siebel or Clarify, CRM vendors with rich software development kits. Open APIs may also be standards, such as Open Database Connectivity (ODBC). In this manner, programmers can master the common API, and use Connectors to interact with multiple APIs without needing to master the interface details of the APIs.

When a software system does not provide an Open API, a Connector can be difficult or impossible to build. These software systems are called "closed." Many times, legacy software systems, especially those built by a business' internal staff, are closed. The large number of closed software systems is well known to be the most significant issue confronting software integration. As a result, while many major software systems have Connectors, most software systems do not. iWay Software, a well known provider of Connectors to commercial software systems, has less than 300 Connectors as of this writing. This is just a tiny fraction of software systems in existence.

When a family of software systems or hardware devices exist that provide common functionality but are manufactured by multiple vendors, standard APIs are defined, typically by a major vendor or a consortium of vendors. Connectors built to a standard API meant to be used by a plurality of parties, rather than an API to a specific software system, are typically called Drivers. For example, Microsoft has defined numerous API standards for their Windows operating system to drive hardware devices such as video cards. The IVI Foundation has defined the Interchangeable Virtual Instruments API standards for the measurement and instrumentation industry for driving a variety of hardware devices, such as for data acquisition. IVI drivers are one of the standards National Instruments uses for integration to hardware devices in their Visual Programming tool, LAB-VIEW®. Database vendors typically provide a specific connector to their database software, as well as an ODBC Driver using the well known ODBC standard mentioned above.

Drivers have been historically limited to provide the necessary abstraction to make the most common computing tasks possible, such as accessing a database or rendering graphics on a computers display. The effort required to create a suitable standard that has a chance of industry adoption is high. Programmers compete by creating new software systems with proprietary and differentiating functionality where standards are impossible to define, even for two software systems which aim to solve the same problem. As a result, Drivers exist for a small number of very narrow domains.

A more recent form of Connector is one where a user interface is provided for interrogating a software system's Open APIs to construct a new API in a preferred form. This type of Connector is typically called an Adapter. iWay Software allows for Adapters to be constructed that may combine many elements of a complex software system, such SAP or Clarify, to produce a Java or Web Service API. This not only shields programmers from the technical details of the target systems APIs, but allows them to dynamically define the new API customized to their needs. This eliminates the common problem of standards that become out of date.

While Adapters overcome some of the issues with Connectors or Drivers, the production of a programmatic API limits its use to programmers with tools compatible with the software platforms an Adapter chooses to support. Additionally, Adapters of the prior art are limited to Open APIs, and therefore do not overcome the issue of the majority of software systems that are closed.

Visual Programming tools of the prior art have significant limitations in their ability to integrate with existing software systems. They are known to support graphical nodes that expose Drivers, and as a result the Visual Programming tools of the prior art have been limited to very narrow domains where compatible Drivers have been constructed.

Additionally, a Visual Programming environment may be able to dynamically integrate to existing software systems when the software system offers a programmatic interface compatible with the Visual Programming environment, such as a tool developed for the MICROSOFT WINDOWS® platform may be able to integrate with a software program that offers a COM API. Not only does this require knowledge of programmatic interfaces beyond that of many users, it limits the available software programs to those that offer a compatible programmatic interface. The number of software programs that offer incompatible programmatic interfaces is far greater than those that do, and therefore strictly limits the number of available compatible programs.

A Visual Programming tool may use an Adapter that provides a compatible programmatic interface, but this would not overcome the limitations Adapters impose on integration with open systems.

Due to these limitations, Visual Programming tools of the prior art have been limited to small exclusive domains where extensive concerted efforts have been made to create a catalog of reusable components. The majority of new software solutions are therefore still manually created by programmers at great expense, time, and risk. The present invention addresses these problems and deficiencies and others in the manner described below.

SUMMARY OF THE INVENTION

The present invention relates to a visual software development system and method in which a user can graphically build a design or software solution without having to write software code and which can use elements of disparate software systems. The system includes one or more adapters that interrogate interfaces of the software platform that the software system or systems was built in accordance with and generate descriptions that the user can then incorporate into the design. The descriptions can be represented graphically for the user with icons in an integrated development environment (IDE), and the user can build the design by dragging or otherwise selecting descriptions to be used and connecting them together to graphically represent the flow of information or communication of events among the descriptions.

Elements of two or more software systems of disparate technologies or platforms can be used together in the same design by providing an adapter suited to each technology. For example, a first adapter can be provided that is associated with World Wide Web ("Web") technology, and a second adapter can be provided that is associated with Microsoft Windows technology. The user can cause each adapter to interrogate the interfaces and functionality of an application program or other software system belonging to the associated platform. For example, the user can cause a Web adapter to interrogate the user interface of a Web browser such as Internet Explorer and cause a Microsoft Windows adapter to interrogate the user interface of a calculator program, such as the familiar calculator utility or "accessory" that has commonly been provided along with the Windows operating system on essentially every Windows-based computer. Each adapter produces one or more descriptions that describe one or more elements of the application program it interrogated. Thus, in this example, without writing any software code, a user can build a design in which the Calculator communicates with Internet Explorer. A loader is also included, through which the user can cause the algorithm defined by the design to be executed or effected. For example, the algorithm can be that data gathered from the Web via the browser is input to the Calculator, and the Calculator performs some simple numerical calculation upon the data.

The straightforward if not trivial example of a calculator program communicating with a Web browser is intended merely for purposes of illustrating the power and flexibility the invention can provide to a user. However, in another example, a businessperson with little or no programming knowledge whose job involves using a first application program to process product orders, a second application program that controls shipping, and a third application program that produces sales reports for management personnel could use the invention to integrate functions or elements of the three programs in a manner that reduces a user's need to switch among the three programs, import data from one program to another, and otherwise use the programs individually. The invention allows such a user to integrate such programs in an automated manner into a unitary design of the type described above, such that the user need only execute and interact with the design to use disparate elements of the application programs or other software systems that are included in the design.

BRIEF DESCRIPTION OF THE DRAWINGS

FIG. 20 is an XML listing of a Type Dictionary of the exemplary embodiment of the invention.

FIG. 21 is an XML listing of an Object Graph of a Design Component of the exemplary embodiment of the invention.

DETAILED DESCRIPTION

System Overview

Figure 1:
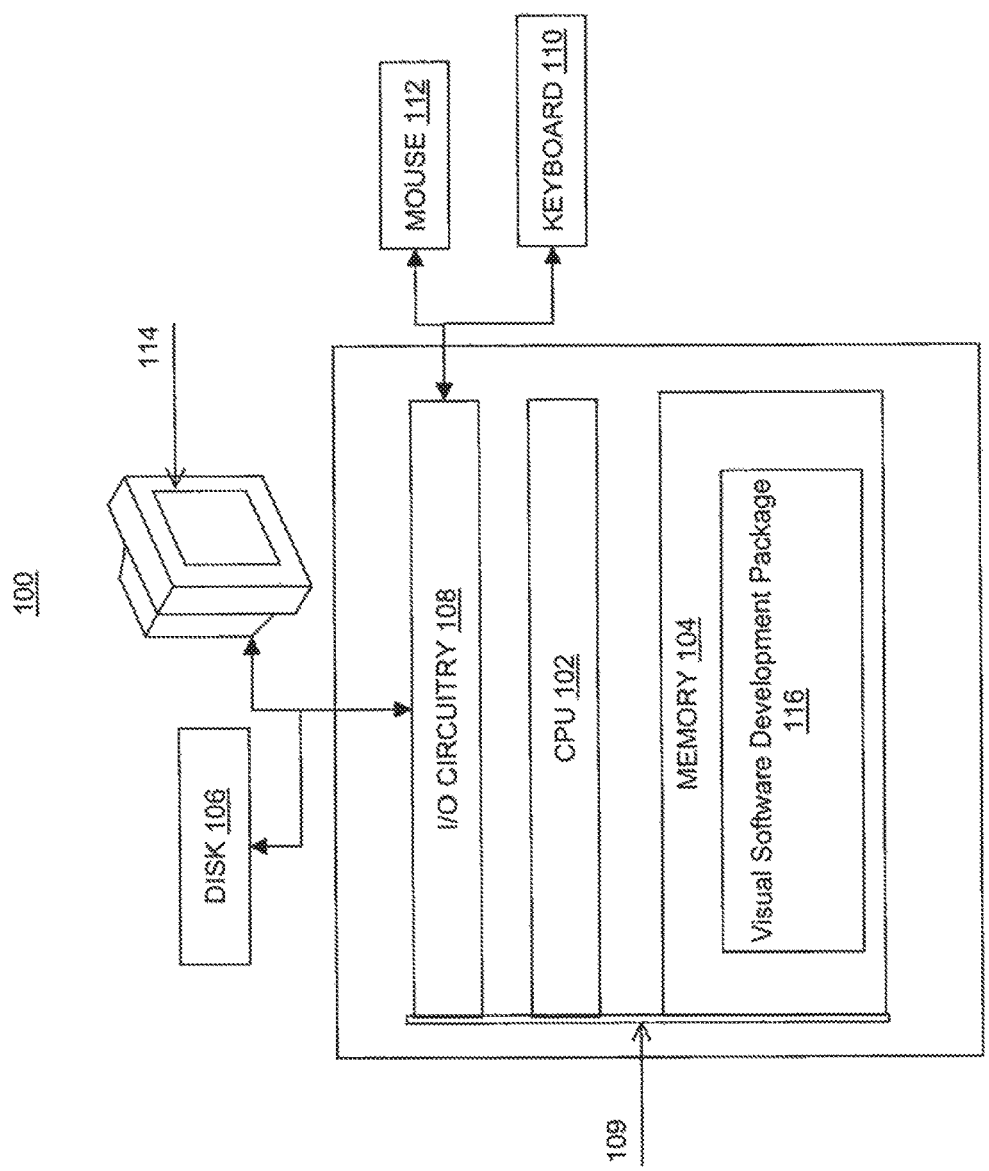
FIG. 1 is block diagram of a computer system on which software embodying the present invention can be executed and used.
Figure 2:
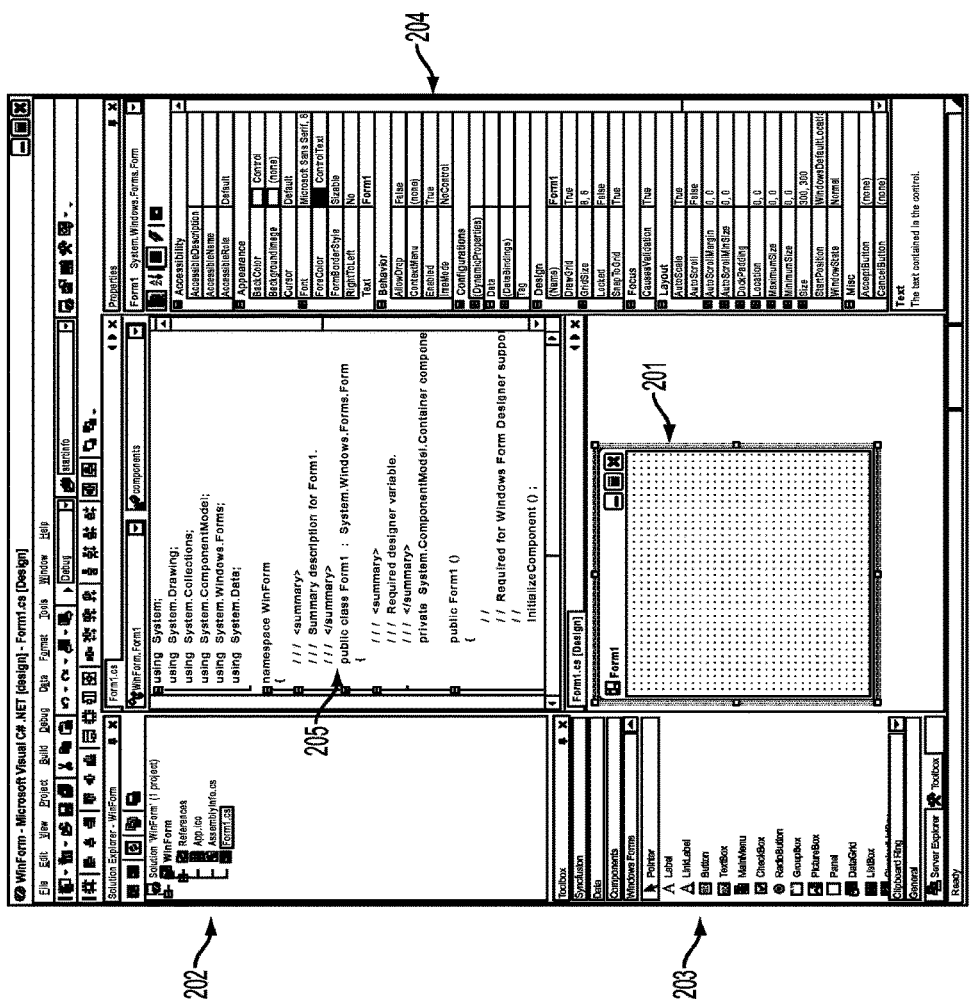
FIG. 2 is a screen shot, illustrating an integrated development environment of the prior art.

As illustrated in FIG. 1, in an exemplary embodiment of the present invention, a person (user) can use a computer system 100 to effect the methods of the present invention as described below. Computer system 100 can be an ordinary personal computer or a computer of the more powerful type generally referred to in the art as a workstation and commonly used in computer-aided software design, electronic circuit design, and the like. Computer system 100 can include any of the hardware and software elements commonly included in such computers, such as a central processing unit 102, memory 104, disk or similar non-volatile storage 106, and input/output circuitry 108, interconnected by a suitable buss system 109. In accordance with the conventional graphical user interface (GUI) and windowing paradigms, the user can use a keyboard 110 and mouse 112 to interact with active graphical objects that may be displayed (not shown in FIG. 1 for purposes of clarity) on a screen 114. Using the mouse, the user can select such objects by clicking the mouse button, drag or move the objects from one location on screen 114 to another (e.g., within a window or from one window to another), and perform other such operations of the types common in computer systems operating in accordance with conventional GUI paradigms.

Among the software elements included in computer system 100 is a visual software development software package 116 that, in conjunction with the hardware and other elements of computer system 100, described above, and under control of the user, effects the methods of the present invention. A visual software development software package 116 is illustrated conceptually for purposes of illustration as residing in memory 104, but as persons skilled in the art can appreciate, may not actually be stored or otherwise reside in memory in its entirety at any given time. Rather, portions or elements of it may be retrieved and executed or referenced on an as-needed basis in accordance with conventional operating system processes. It should be noted that software package 116, as stored in or otherwise carried on any computer-usable data storage or transmission medium, constitutes a "computer program product" within the meaning of that term as used in the context of patent claims.

Figure 3:
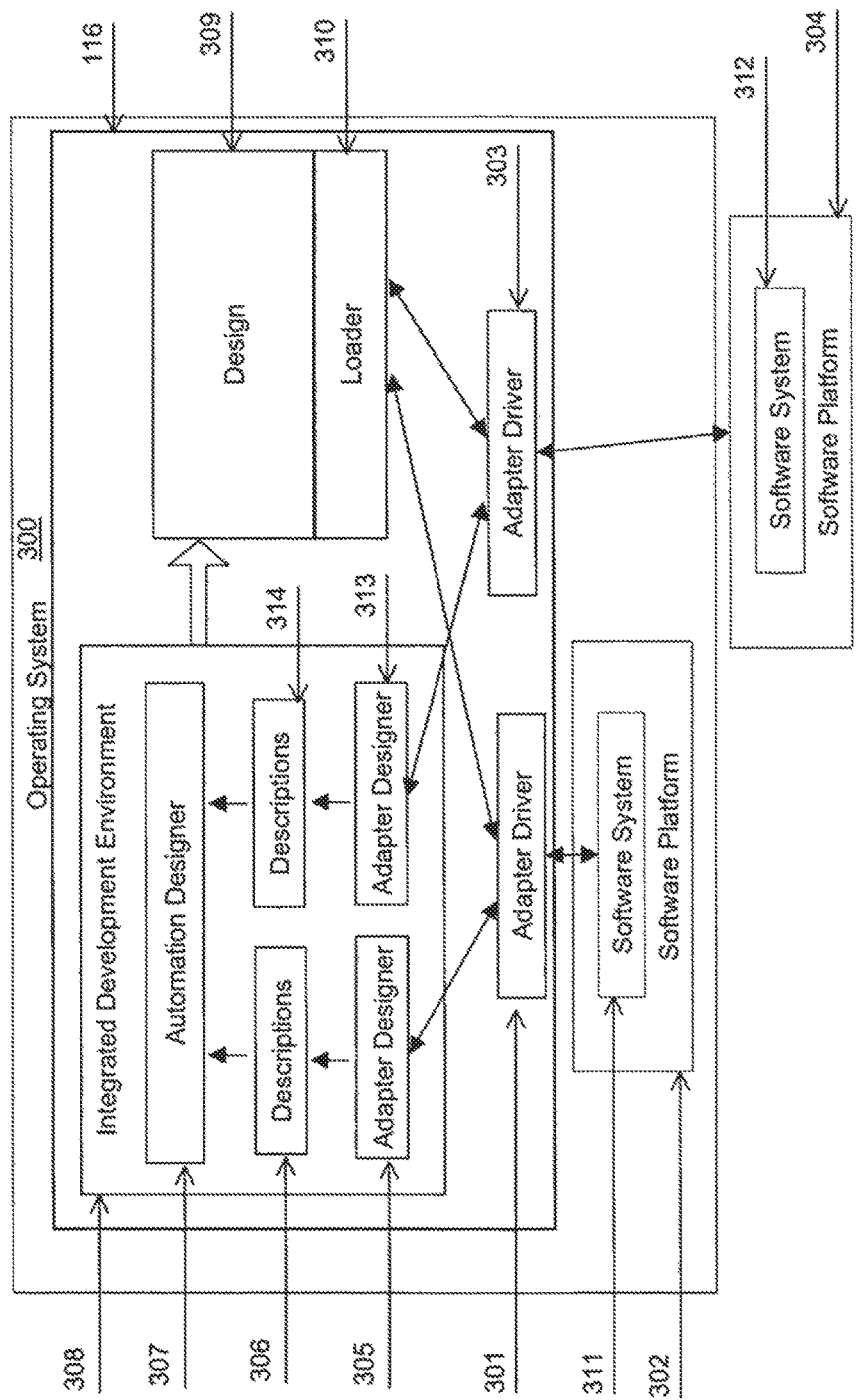
FIG. 3 is a block diagram of a system in accordance with an exemplary embodiment of the present invention.

As illustrated in further detail in FIG. 3, the visual software development software package 116 includes a number of elements that operate in the manner described below, under control of a suitable operating system 300, such as MICROSOFT WINDOWS®. In this operational context, the elements define a system that includes one or more adapters, each comprising an adapter driver 301, 303, etc. and an adapter designer 305, 313, etc. For example, in FIG. 3 a first adapter comprises adapter designer 305 and adapter driver 301, and a second adapter comprises adapter designer 313 and adapter driver 303. As described below in further detail, adapter driver 301 interrogates at least one element of a first software system 311 that is built in accordance with a first platform 312 utilizing the interface of the first platform, and adapter driver 303 interrogates at least one element of a second software system 312 that is build in accordance with a second platform 304 utilizing the interface of the second platform. The adapters generate descriptions 306 and 314 that the user can then incorporate into a design 309. For example, the first adapter can generate descriptions that describe elements of the first software system 311, and the second adapter can generate descriptions that describe elements of the second software system 312. Although two software systems 311 and 312 are illustrated in FIG. 3, any suitable number and type of adapters can be included for interrogating and generating descriptions for any suitable corresponding number and type of software systems. The "type" of software system refers to the platform to which the software system is built in accordance with. For example, MICROSOFT WORD®, a common word-processing application program, is a software system built in accordance with the MICROSOFT WINDOWS® platform. Still other software systems may be associated with mainframe computer platforms, such as an IBM mainframe. Note that software systems 311 and 312 can be of disparate platforms. Where software platform 302 is illustrated as existing on the operating system 300 that executes the IDE 308, the software platform 304 is illustrated as outside operating system 300 and thus not compatible with operating system 300.

In view of the teachings in this patent specification, persons skilled in the art will be able to make and use adapters for essentially any software system of essentially any suitable platform. As described below, the adapters can interrogate and otherwise interact with any portion or element of the software system for which the user desires to create a corresponding description. Software systems can include not only application programs but also libraries, objects, controls, applications, and web sites. Each description can describe one or more elements of a software system. The term "element of a software system" refers to any unique instance of a type of software platform functionality contained in the software system. The term "interrogate" refers to utilizing a software platform specifically to discover and identify software systems, to further discover and identify software elements of chosen software systems, and to monitor the ongoing state of the software system and its elements. "Utilizing" a software platform refers to the act of invoking functionality exposed by the software system or platform.

As described in further detail below, the descriptions generated by the adapters can be represented graphically (i.e., displayed on screen 114) for the user with icons under control of an integrated development environment (IDE) 308. Using IDE 308, one can select and interconnect descriptions to build the design 309 and thereby define algorithms in a manner analogous to that in which a circuit designer uses CAD system to interconnect icons representing electronic components.

Thus, each adapter designer 305 and 313 utilizes its corresponding adapter driver 301 and 303, respectively, to expose a visual representation of software system 311. A person can use the adapter designers 305 and 313 to build descriptions 306 and 314, respectively, each of which describes elements of the software system's 311 functionality by capturing the necessary information specific to software platform 302 to identify or otherwise discover the functionality and invoke the functionality during the software system's 311 execution. Each of adapter drivers 301 and 303 comprises software that utilizes software platform (302 and 304, respectively) functionality to carry out of the act of interrogating software systems 311 and 312, respectively, during the building of the design 309, and carries out the requests of the descriptions 306 and 314, respectively, to effect the user-defined algorithms contained within the design 309. The descriptions 306 and 314 comprise software that represents the identity of an instance of a software element and functionality to interact with the instance in response to interconnections using the corresponding adapter driver 301 and 303, respectively, that provided the descriptions.

IDE 308 further includes an automation designer 307 that allows user-defined algorithms to be designed by selecting two or more components from descriptions 306 and graphically creating the interconnections between the selected descriptions 306 such that the control and data flow of the algorithm is captured. Components may be selected from descriptions 306 and descriptions 314 to design a user-defined algorithm that includes functionality from both software system 311 and software system 312.

IDE 308 can include the ability to create user interfaces, such as a Windows Form 402, for its target platform, and may include an adapter designer and adapter driver to its target platform enabling the user interfaces to be included in user-defined algorithms.

IDE 308 produces a design 309 that contains the descriptions and their interactions. A loader 310 loads the descriptions, which in turn load or otherwise establish interaction with the adapter drivers 301, 303 that were utilized in their design. In one embodiment, a loader 310 may be an engine that reads metadata in order to de-serialize one or more functioning object graphs representing the descriptions and their interactions contained within the design 309. Object graphs are known to be hierarchical with a parent object may contain references to child objects, where the child objects may contain references to their own children and so on to an arbitrary level. In another embodiment, a loader 310 may be an executable shell that contains or otherwise links to libraries, object modules, and resources produced by compiling source code representations of the descriptions and their interactions contained within the design 309. In another embodiment, the loader 310 may be a Virtual Machine which reads instruction representations of the descriptions and their interactions contained within the design 309. The loading of the descriptions and interconnections of the design cause the effect of the user-defined algorithms contained within the design 309. Note that at no time during the course of using the adapters to generate the components, using IDE 308 to select and interconnect them to form a design embodying an algorithm, and using loader 310 to effect the algorithm, are any of the original software systems 311 and 312 extended or modified.

Integrated Development Environment (IDE) 308

Figure 4:
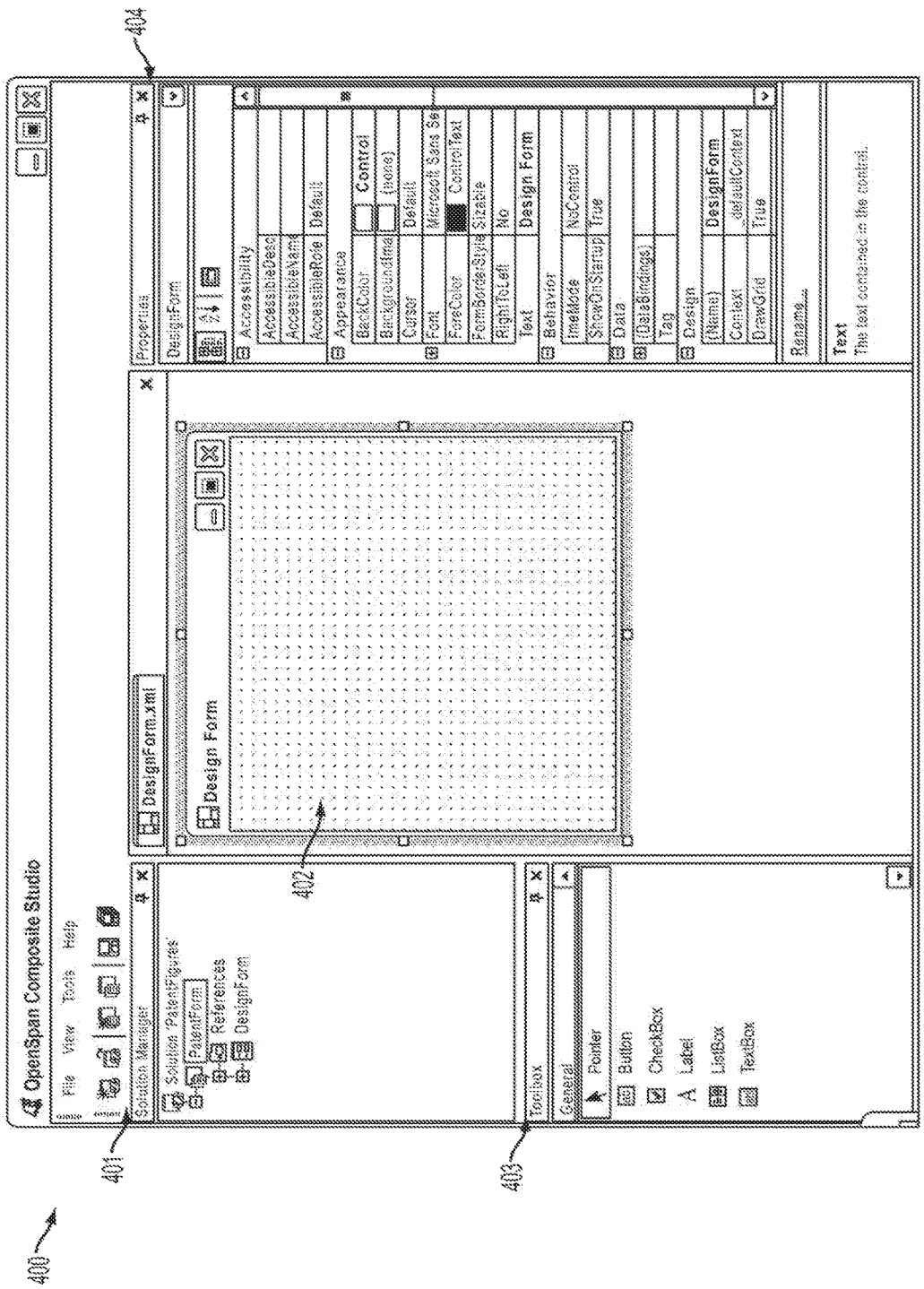
FIG. 4 is a screen shot, illustrating the integrated development environment of the exemplary embodiment of the invention.

FIG. 4 shows a screen 400 of the graphical user interface of IDE 308, referred to for convenience herein as the Composite Studio IDE. The Composite Studio IDE includes graphical objects or areas that are referred to for convenience herein as the Solution Explorer 401, the Design Surface 402, the Toolbox 403, and the Property Grid 404. The Solution Explorer 401 shows a hierarchical view of objects in the solution. The Design Surface 402 shows the user interface of a designer of a component under construction, in this case a Windows Form. The design surface of a visual control is typically a "what you see what you get" (WYSWYG) view of the control's runtime representation. The Toolbox 403 shows existing software programs that have been imported into the Composite Studio and can be used in the construction of a new software solution. In this case, the programs are a variety of visual controls provided by the .NET Framework. The Property Grid 404 delineating the properties of the currently selected object.

The following is a description of an example using Microsoft's Calculator application program to launch a Web-based search using the search engine found on the Microsoft Network (MSN) home page at www(dot)msn (dot)com. This illustrates how Web and Windows applications can be integrated into a new software solution or design 309.

Figure 5:
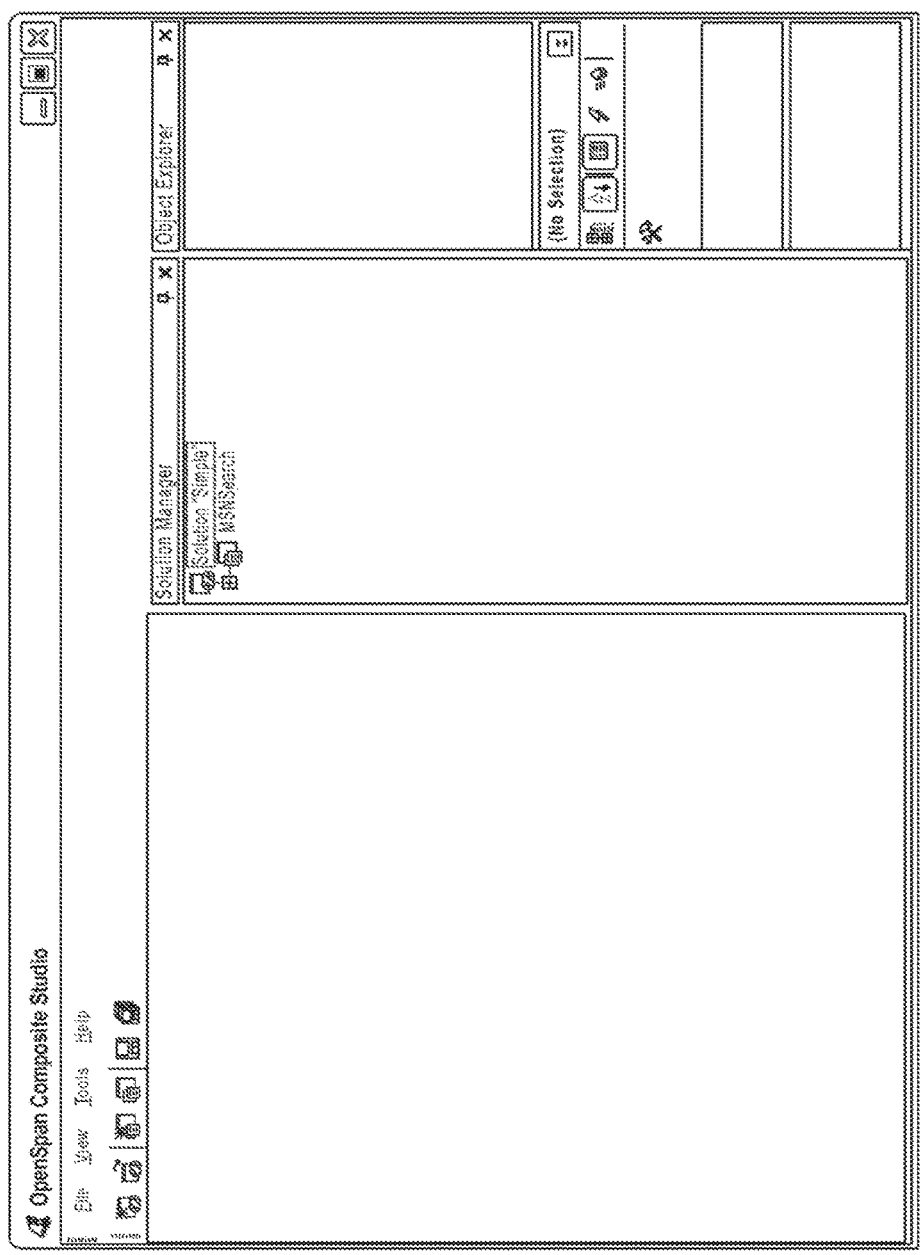
FIG. 5 is a screen shot, illustrating a Solution and Project added to the IDE of FIG. 4.

FIG. 5 shows a screen 500 representing the Composite Studio IDE after selecting From the File menu, New/Blank Solution. The New Solution dialog opens with default entries in the Name and Location fields. "Simple" is entered as a Solution name and folder is selected for the solution location. Composite Studio shows the location of the Solution, the Solution name and extension at the bottom of the dialog. Ok is selected to accept the name and location. The dialog box clears and the Solution listed in the Solution Manager toolbox shows the entered name. The toolboxes are automatically updated as items are added to your solution. A Project is added by highlighting the solution, right-clicking and select New Project from the pop-up menu. The New Project dialog opens displaying available types of Adapters you can add to your solution. Default entries display in the Name and Locations fields. "MSNSearch" is entered for Project Name, and a folder is selected. Composite Studio shows the location of the Project, the Project name and extension at the bottom of the dialog. OK is selected to save the Project. Composite Studio dismisses the New Project dialog, and the new Project is listed in the Solution Manager toolbox. Properties for the new project display in the Properties toolbox when the new project is selected.

Figure 6:
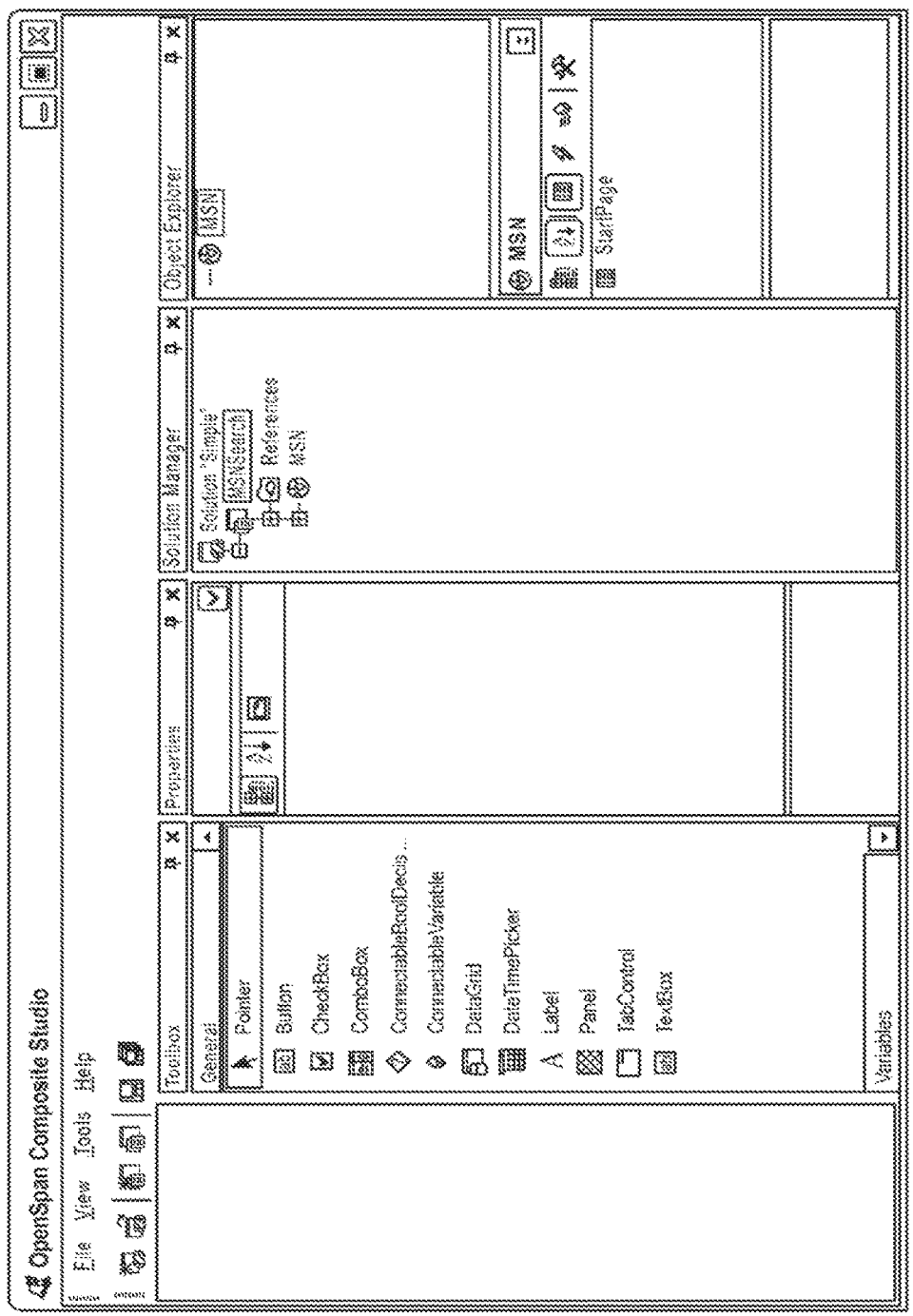
FIG. 6 is a screen shot, illustrating a Web Adapter added to the IDE of FIG. 4

FIG. 6 shows a screen 600 representing Composite Studio IDE during addition of a Web application adapter to the project. As noted above, software system 311 may be a Web page such as that of Microsoft Network (MSN) at www (dot)msn(dot)com. A Web application adapter can be added by highlighting the Project in the Solution Manager toolbox, right-clicking and select Add New Project Item from the pop-up menu. The New Project Item dialog opens displaying available types of project items. The Windows Form and Windows Control items are .NET Controls that can be constructed within the Composite Studio in a manner similar to modern RAD tools. The Win32 Application and Web Application are Adapters to existing software programs of the indicated platform. Automations are algorithms that can be graphically constructed within the Composite Studio using a diagramming paradigm. The Web Application Adapter is selected and "MSN" is entered for its name. Ok is selected to save the new Project item. Composite Studio dismisses the New Project dialog. A Designer page for the new item is automatically created and fills the center pane of the Composite Studio window. The new item displays in the Solution Manager tool window, and when you highlight the item, properties for the new project item display in the Properties tool window.

Figure 7:
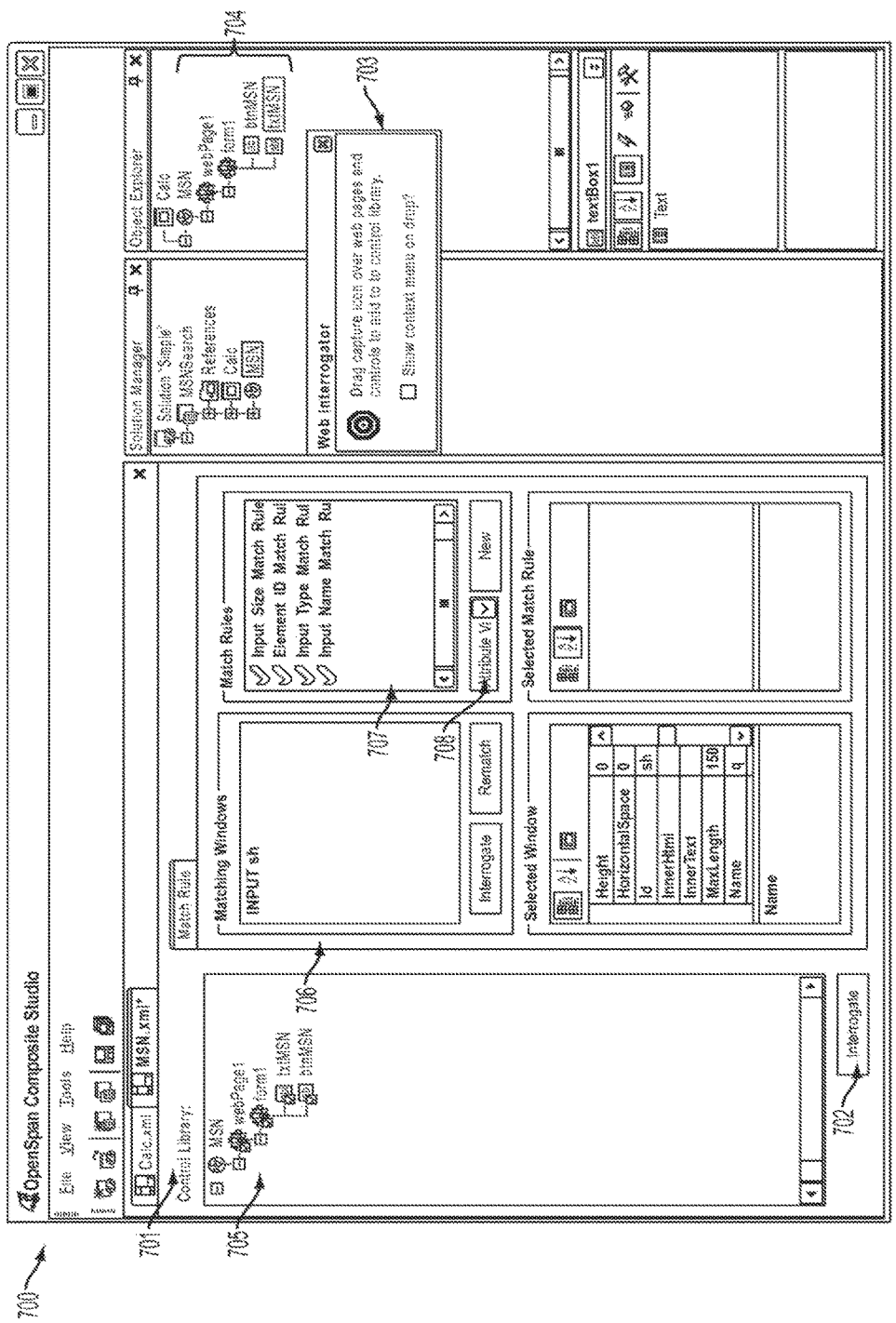
FIG. 7 is a screen shot, illustrating a Web Adapter Designer of the exemplary embodiment of the invention.

FIG. 7 shows a screen 700 representing the Composite Studio IDE during interrogation of a Web Application (e.g., software system 311) to build a description (e.g., a corresponding description 306). By selecting the MSN Adapter in the Solution Manager, the Web Adapter Designer 701 comes into focus. Web Adapters require the URL of the target Application to be configured. The MSN Adapter is selected in the combo-box at the top of the Properties toolbox. In the "Misc" section of the Properties toolbox, the "StartPage" property is selected and "www(dot)msn(dot)com" is entered for the URL.

Each adapter enables interrogation of its target application or other software system (e.g., 311 and 312). For the Web Adapter, the Interrogate 702 button is selected which opens the MSN web page and opens a small dialog named Web Interrogator 703. The target icon is used on this dialog to drag over the areas on the MSN web page that you want to capture and use in the solution. Items of a Web interface include pages, controls, fields, etc. By left-clicking on the bulls-eye shaped target icon in the Web Interrogator 703 dialog and dragging it over the Search text-box on the MSN Window, the text-box item is added to the Web Adapter Designer 701. It is renamed to "txtMSN" in the Properties toolbox to be more meaningful. This process is repeated for "btnMSN." Through this process, a description indication 704 for the Web Application has been built.

Figure 8:
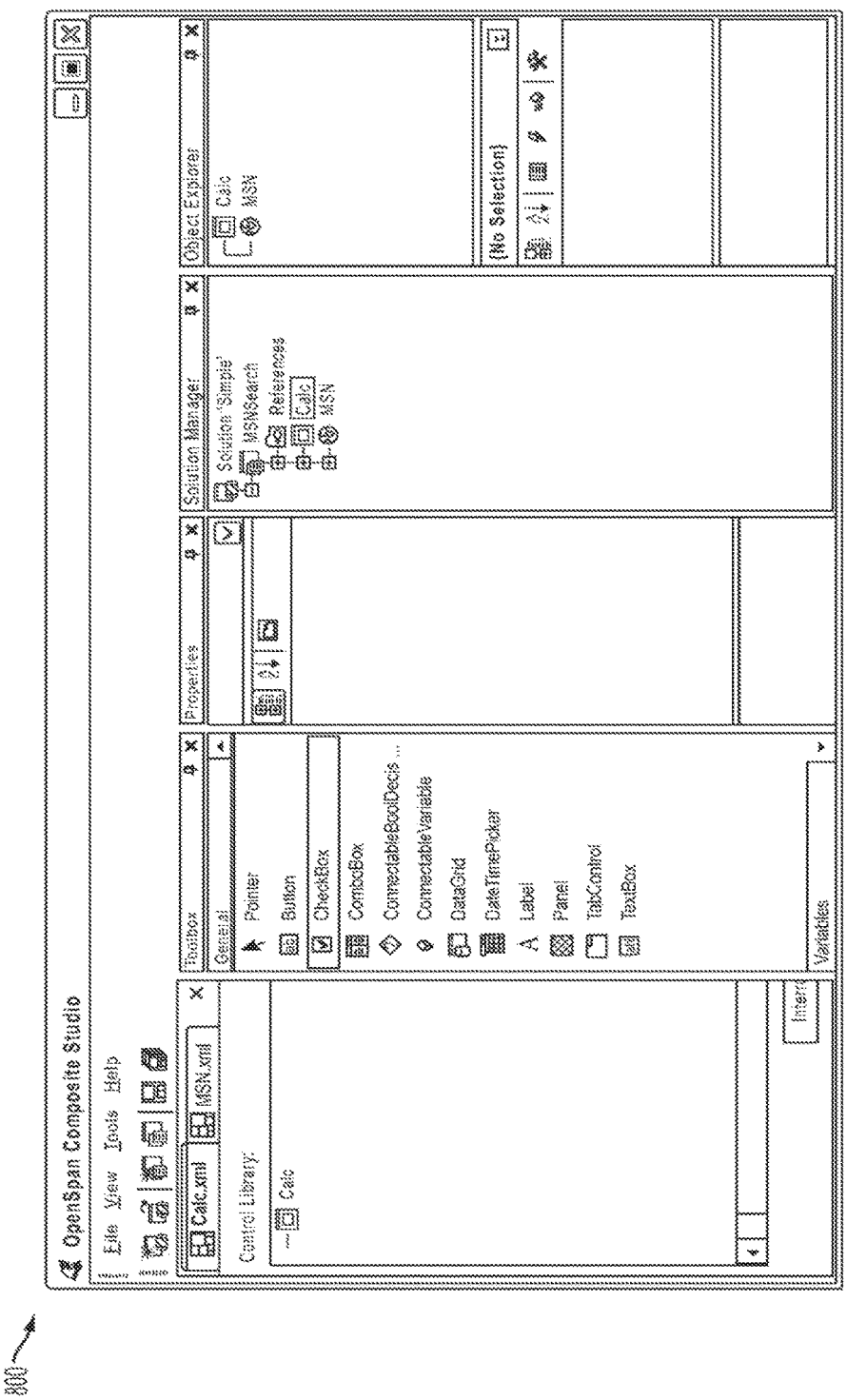
FIG. 8 is a screen shot, illustrating a Windows Adapter added to the IDE of FIG. 4.

FIG. 8 shows a screen 800 representing the Composite Studio IDE during addition of an Adapter to a Windows application. This is done by selecting the Project in the Solution Manager toolbox, right-clicking and selecting Add New Project item from the pop-up menu. The Win32 Application Adapter is selected, named to "Calc", and OK is clicked.

Figure 9:
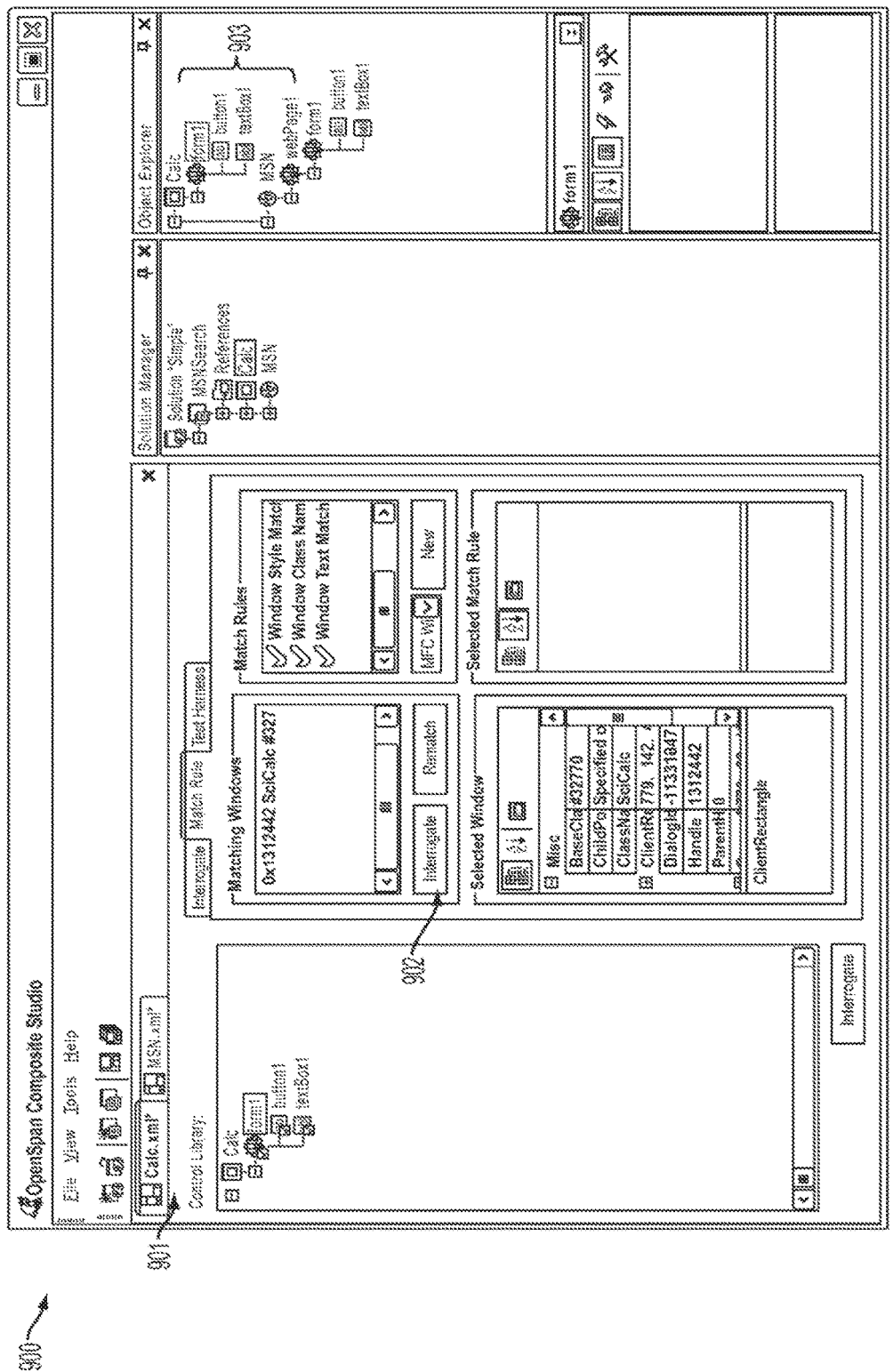
FIG. 9 is a screen shot, illustrating a Windows Adapter Designer of the exemplary embodiment of the invention.

FIG. 9 shows a screen 900 representing the Composite Studio IDE while interrogating a Windows Application (e.g., software system 312) to build a description (e.g., a corresponding description 314). As noted above, a straightforward example of a Windows application program is the familiar Calculator tool or accessory found on essentially every Microsoft Windows-based computer. The Path property 901 is set to the location for the Calculator executable file. By selecting the Interrogate 902 button, the Calculator application will open along with the Interrogator dialog. The M+button on the Calculator and the Results box are selected causing two items to be added to the Adapter, button1 and form1. Using the Properties toolbox, their names are changed to "btnCalc" and "txtCalc." Through this process, a Description 903 for the Windows application has been built.

Figure 10:
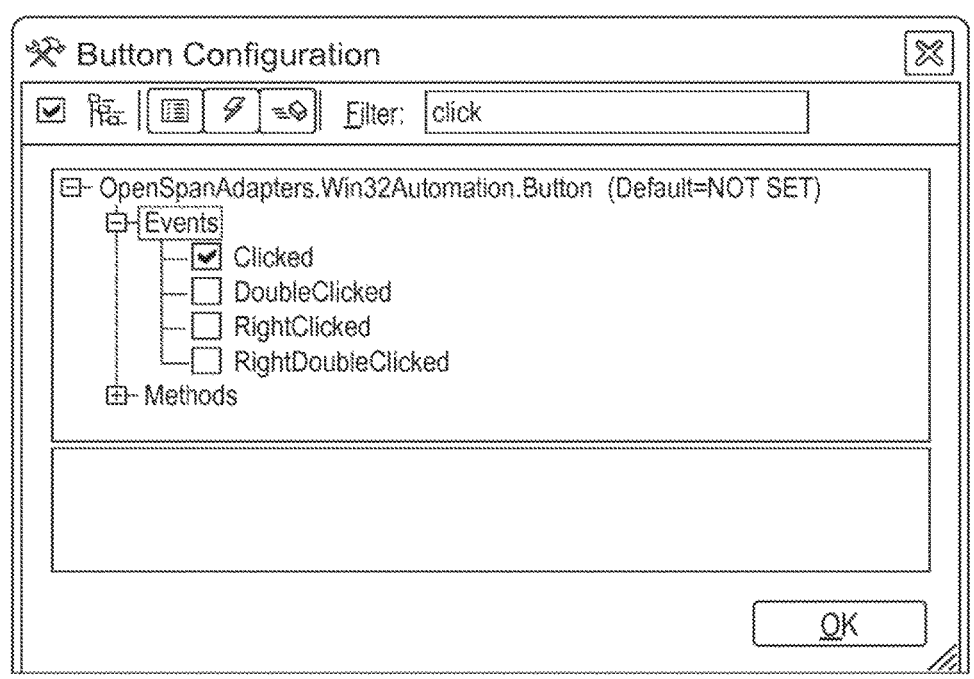
FIG. 10 is a screen shot, illustrating a Type Configurator of the exemplary embodiment of the invention.

FIG. 10 shows a dialog box 1000 representing the Type Configurator of the .NET Component adapter that configures the Descriptions produced by the Adapters above. In the Object Explorer window the Calculator-Button is selected to make active, and the icon of a Hammer and Wrench is selected.

The Button Configuration dialog displays. The dialog lists Properties, Events, and Methods for the OpenSpan.Adapters.Win32.Automation.Button. The Filter edit box enables you to seek a specific member.

Each Component's properties, events and methods must be identified before they are available for use. The Events node is expanded, and the "Clicked" event is enabled.

The above-described process is repeated for the Calculator-TextBox. The "Hammer and Wrench" icon is selected for the Calculator TextBox, which displays the TextBox Configuration dialog. The Properties node is expanded, and the "Text" property is enabled.

Figure 11:
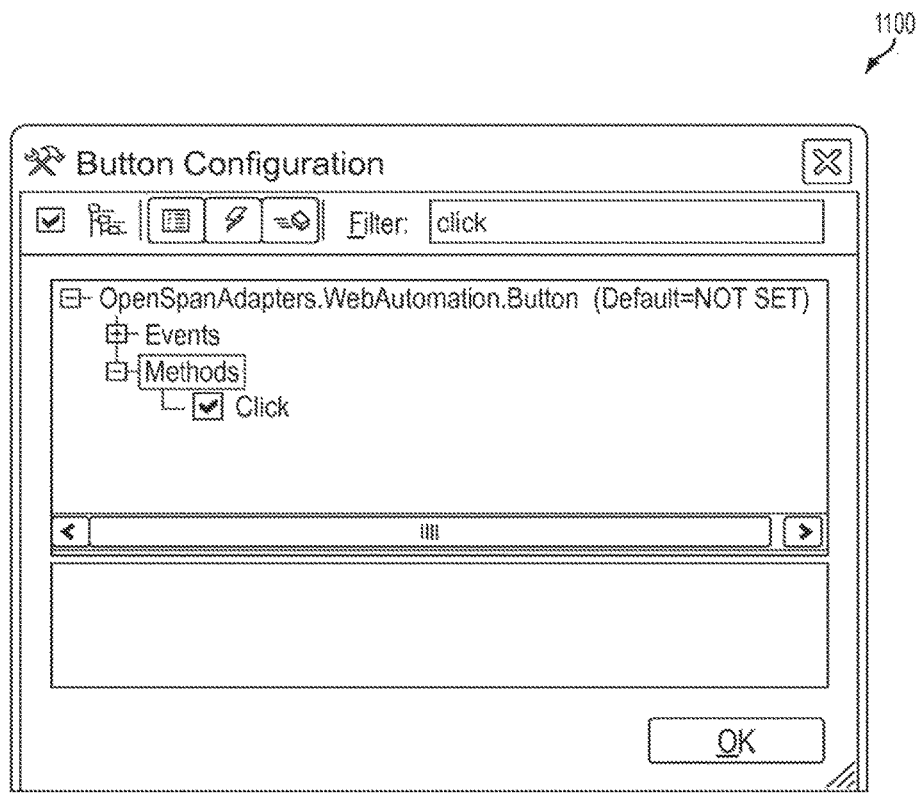
FIG. 11 is a screen shot, illustrating a Type Configurator of the exemplary embodiment of the present invention.

FIG. 11 shows a dialog box 1100 representing the Type Configurator that repeats the previous step for the Web Adapter's Description components. The Web Adapter-Button is selected, the Type Configurator Dialog displayed, and the Methods-Click and Properties-Text items enabled.

Figure 12:
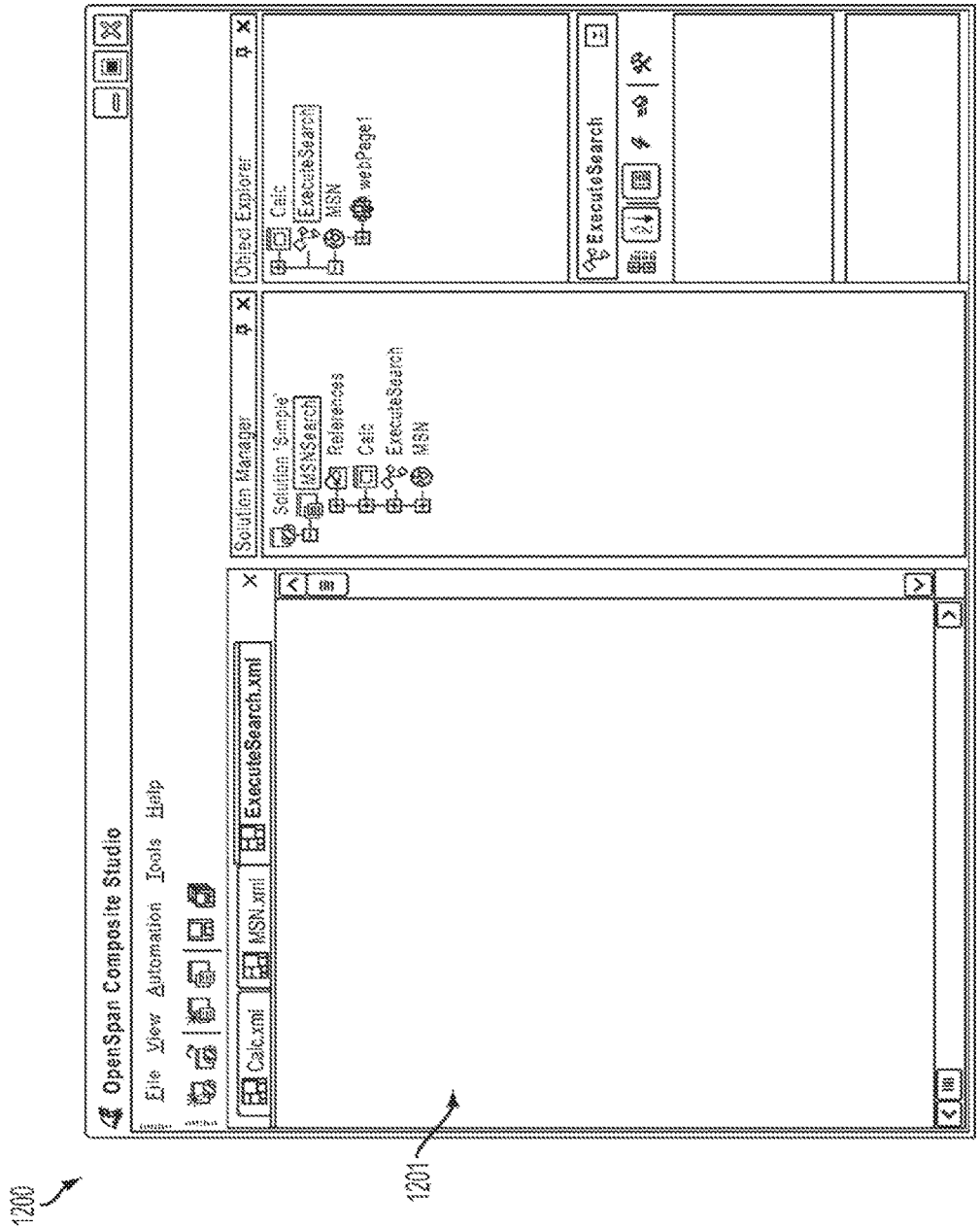
FIG. 12 is a screen shot, illustrating an Automation Designer of the exemplary embodiment of the present invention.

FIG. 12 shows a screen 1200 representing the Composite Studio IDE during addition of an Automation to the solution. This is done by right clicking on the project and selecting Add New Project Item from the local menu. The New Project Item dialog displays and Automation is chosen. Automations may be added at the Project level, or under an existing Project item. This Automation is named "ExecuteSearch", and the Automation Designer 1201 design surface is displayed.

Figure 13:
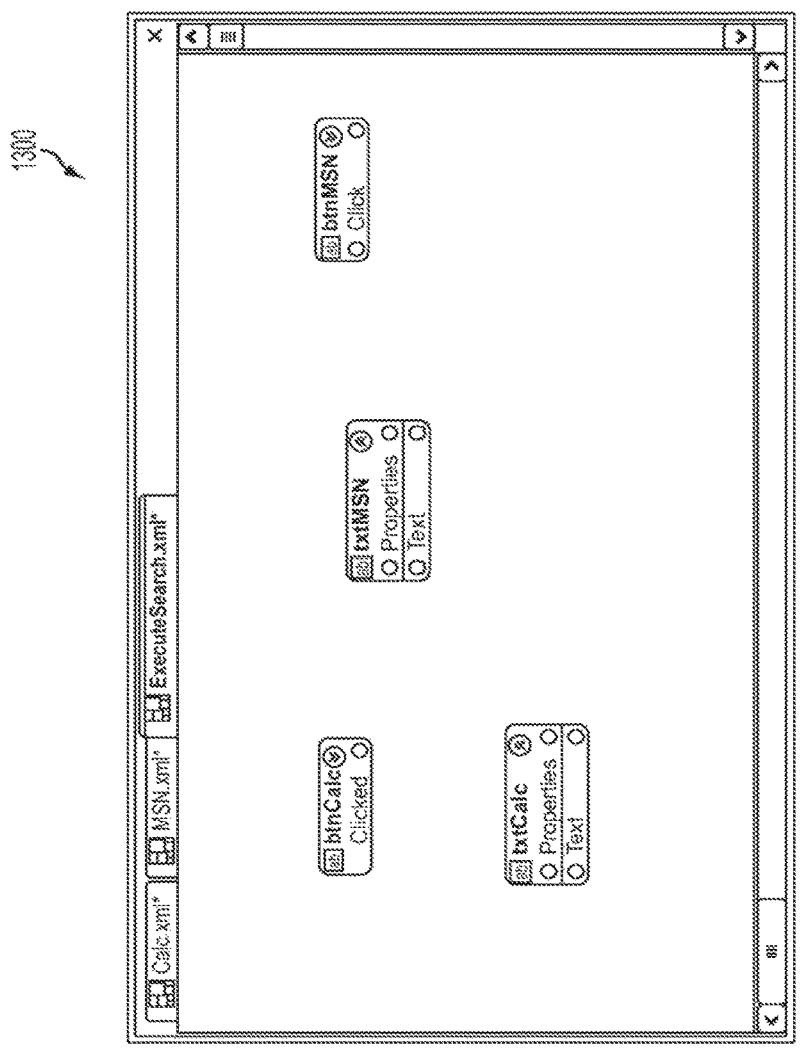
FIG. 13 is a screen shot, illustrating Connection Blocks of the exemplary embodiment of the invention.

FIG. 13 shows a screen 1300 representing the Automation Designer 307 (FIG. 3) creating an Automation algorithm using the Automation Designer 307. The Automation Designer allows interface items configured from Adapter Description components to be visually linked to define a sequence of steps to solve a particular problem.

The following example demonstrates performing a search on the MSN Website using the value from the Calculator TextBox. From the .NET Component Adapter's Object Explorer, highlight the Calculator-Button and then from the .NET Component Adapter's Object Inspector, drag the Clicked event (enabled above) to the Automation Designer surface. This will display a node on the designer surface that shows the Clicked event as having one yellow control output port.

In the manner above, the Calculator-TextBox-Text property, MSN-Button-Click method, and MSN-TextBox-Text property are dragged onto the Automation Designer surface.

Figure 14:
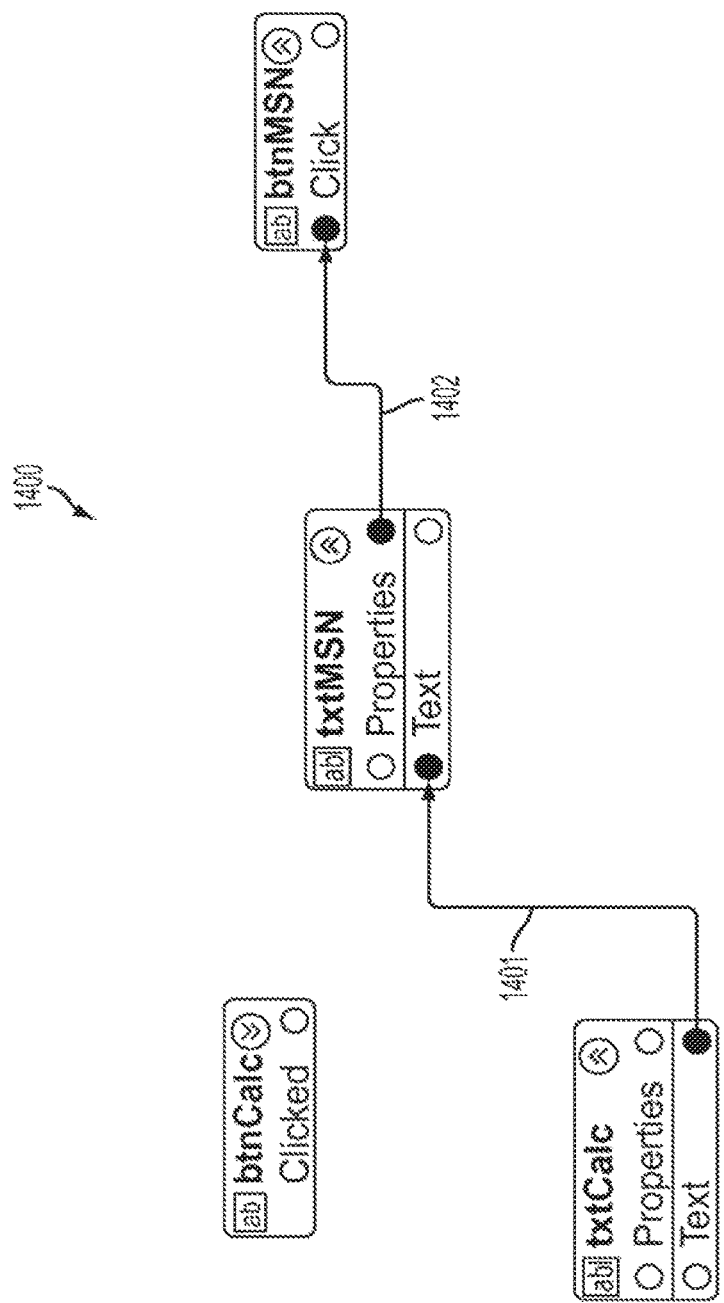
FIG. 14 is a screen shot, illustrating Links of the exemplary embodiment of the present invention.

FIG. 14 shows a portion of the screen 1300 after the connecting of 3 of the Automation nodes. The output (right) Text port of the txtCalc Properties node is selected, and the input (left) Text port of the txtMSN Properties node. This establishes a Data Link 1401 between the data items of the disparate software solutions.

Next is demonstrating the flow of control through the algorithm. The sequence will be that when a user presses the Calculator button (M+), the calculator text box data will propagate to the MSN Web Search field and the Search button will be clicked. Clicking the search button causes the Search to occur.

For the above, the output (right and only) Clicked port of the btnCalc node would be selected and linked to the left (input) txtMSN.Properties Control port. When a node's input Control port is signaled, the node will carry out its defined action, and then raise a signal from its output (right) control port to notify any connected nodes that it is complete and pass control to them. In the case of a Properties node, the action is to propagate data across each of its data links. The output (right) control port of the txtMSN Properties node is then connected to the input (left) control Port of the btnMSN Click Method node. This establishes an Event Link 1402 between the control items of the disparate software solutions. This completes construction of a new software solution that integrates two applications from different platforms in a completely graphical manner without modifying or extending either application.

To summarize the behavior or algorithm defined by the resulting design 309, a user may enter data into the Calculator TextBox. When the "M+" button is pressed, the Calculator's TextBox value will be propagated to the MSN Web Page's Search Field. Finally, the search button will be clicked that causes the MSN Web Application to perform a search using the data was propagated into its Search field.

The IDE 308 (FIG. 3) can be constructed, as in the exemplary embodiment of the invention, using Microsoft's NET Framework, though one skilled in the art will recognize that there are numerous suitable software platforms that can be used in other embodiments .NET provides the Framework Component Library (FCL) that contains thousands of types that are the basic building blocks for objects and software programs built using the framework. The types are grouped into namespaces that allow organization, such as by author or function.

In the exemplary embodiment, IDE 308 includes a Solution Explorer that is implemented with a hierarchical Tree View control, which can be of any suitable type known in the art. A suitable Tree View control is available from Microsoft Corporation of Redmond, Wash. The IDE 308 also includes a Toolbox control which can be of any suitable type known in the art. A Suitable Toolbox control is available from Syncfusion Inc. of Morrisville, N.C. The IDE 308 further includes a Property Grid control which can be of any suitable type known in the art. A suitable Property Grid control is available from Microsoft Corporation.

The .NET Framework includes a Design-Time Architecture that provides interfaces and classes for customizing component behavior and user interfaces in a design-time environment. Design-time is the time when a software program is under construction, whereas runtime is defined as the time when a completed software program is operating. The IDE of the preferred embodiment takes full advantage of the .NET Framework's Design-Time Architecture. Microsoft provides extensive documentation on the NET Framework's Design-Time Architecture.

.NET organizes related types in namespaces to provide an organizational hierarchy. For example, the Textbox type is found within the framework at System.Windows.Forms.Textbox.

.NET objects that implement System.ComponentModel.IComponent are called components. Each component can be added to a container object that implements the interface System.ComponentModel.IContainer. Containers are objects that contain zero or more components.

Each .NET component has a designer associated with it. A designer is an object that implements the interface System.ComponentModel.Design.IDesigner. The designer contains the additional code needed to manipulate the component at design-time. A designer may perform a very simple task, such as hiding or changing properties on the component that should not be available at design time, or it may work with other designers to provide a visual editor for a group of components, such as a Form designer.

There may be many designers created for a visual editor. One of these designers must be the "master" that provides a user interface. This designer is called the Root Designer and implements the interface System.ComponentModel.Design.IRootDesigner, and the component it is bound to is called the Root Component.

In the illustrated embodiment, a "Design Component" acts as a Root Component. Design Components provide the functionality necessary for compatibility with the .NET Framework's Design Time Architecture, the runtime environment of the present invention, and the Software Abstraction Layer of the present invention. Design Components implement the System.ComponentModel.IContainer interface, and can contain components that are added to it as part of the design process.

Design Components embody the base building blocks of a software program. A "Windows Form" allows construction of a Graphical User Interface for Microsoft Windows. An "Application Bar" allows construction of Graphical User Interface for Microsoft Windows that has special capabilities for docking on the Windows Desktop. A "User Control" allows construction of a control that cannot be instantiated on its own, but may be placed on another Control, such as a Windows Form, Application Bar, or User Control. An "Automation" is where algorithms are graphically diagrammed. An Adapter, such as the "Win32 Application", "Web Application", and "Host Application", is where a Description is designed for an existing software program.

As described above and as illustrated in FIG. 4, the IDE 308 includes a Design Surface 402. The IDE 308 can display a Design Surface 402 for each Design Component contained in a solution or design 309.

For each Root Component, there must be a Designer Host. A Designer Host is an object that implements System.ComponentModel.Design.IDesignerHost. Designer Hosts are containers and are responsible for controlling the lifetime of the components it contains.

When a Design Component is initially created, or subsequently loaded into the IDE 308, a Designer Host is created. The Designer Host is a Container, and is responsible for maintaining instances of all components and their designers that has been added to the Root Component during design of the Design Component.

Design Components may utilize a native Root Designer provided by .NET, or may supply their own. Adapter Root Components associate with a custom Root Designer that is designed to best represent the target platform for which it has been constructed. Detailed examples will be delineated later. The Automation Root Component utilizes a custom Root Designer that implements the graphical diagramming and will be delineated later. User Interface Design Components of the preferred embodiment utilize the designers supplied by the .NET framework. The construction of a Windows Form will now be described.

DesignForm is the preferred embodiment's type for constructing a Windows Form. When a Windows Form is added to a Project, a Designer Host is created and told the to add a DesignForm Type. The DesignForm component will be constructed, such as by using System.Activator.CreateInstance. If this is the first component added to the Designer Host, the Designer Host's Root Component will be set to the constructed component, and the Root Designer will be created using TypeDescriptor.CreateDesigner. DesignForm inherits from System.Windows.Forms.Form, and thus this will construct a System.Windows.Forms.Design.FormDocumentDesigner. The IDE will call IRootDesigner.GetView to get a control that presents the user interface of the FormDocumentDesigner, and place this control on a window that is docked in the IDE.

The Toolbox can contain NET Types that may be dragged and dropped onto Root Designers. The Root Designer will tell the Designer Host to add the type, which will cause it to instantiate the type and add it to the Design Component. In this manner, a User Interface can be constructed by adding numerous visual controls to the Form's surface.

Automation

The Automation Designer 307 produces interconnections between the objects of the present invention that are contained in the object graphs of the design 309. When the loader 310 de-serializes the object graphs, the interconnections become functional and begin effecting the user defined algorithm.

Most commercial technologies are implemented using well known platforms. Platforms include: Microsoft's Component Object Model (COM) used with OLE, ActiveX, Com+ and DCOM technologies; Microsoft's Microsoft Foundation Classes (MFC); Microsoft's .NET Framework; Windows API for 32 and 64 bit applications and run on the Windows Operating System; Java, a technology developed by Sun Microsystems for machine-independent software; Java 2 Platform, Enterprise Edition (J2EE), part of the Java platform including numerous API specifications including JDBC, Client side applets, Java Beans, Servlets; IBM's Systems Network Architecture (SNA) used for interconnecting computers (mainframes, S/36, S/38, AS/400) and their resources including printers, dumb terminals (3270, 5250), and applications; and World Wide Web (WWW), web pages authored in Hyper Text Markup Language delivered via the HTTP.

Every platform has interfaces through which it is used. Each platform interface may have numerous elements that will fall into four classifications. User Interface defines how a human operator can interact with the platform. Data defines how software programs will read or write data with the platform. Control defines how other programs will instruct the platform to perform an action. Events are how the platform will generate asynchronous events with associated data that can be caught by other programs To satisfy Automation, an abstraction mechanism to model the above elements is required. For the preferred embodiment, .NET Types were chosen. .NET Types can easily embody all software interface elements .NET Components, types that implement the System.ComponentModel.IComponent interface, are usable within the .NET Designer Architecture, and therefore specifically .NET Components were chosen to provide the abstraction capability. The Descriptions 306, 314 of the present invention are thus implemented as NET Components. Types that descend from System.Windows.Forms.Control are NET Components that offer a visual representation.

A .NET Type can define zero or more elements called members. Members may include but are not limited to constants, fields, type constructors, instance constructors, methods, properties, and events. A constant is a symbol identifies a never-changing data value. A field represents a read-only or read/write data value. An instance constructor is a method used to initialize a new object. A type constructor is a method to initialize a type's static fields. A method is a function that performs operations that change or query the state of a type or an object. A property is a method that allows a simple, field-like syntax for setting or querying part of the logic state of a type or object. An event is a mechanism that allows and object or type to send a notification to a listening type or object. Events are usually fired in response to a state change occurring in the type or object offering the event.

The CLR creates and stores metadata about each type. A Type's metadata describes all the members of a type. To enumerate .NET type members, reflection is used. Reflection allows metadata to be examined, and for the members of types to be manipulated at runtime. Reflection allows types and its members to be referenced by human readable names, further facilitating its use by development tools. Reflection is well understood by persons skilled in the art.

The designs 309 of the present invention are embodied as one or more .NET Component object graphs. The .NET Components used in the present invention are provided by either a Component Designer of the Integrated Development Environment, such as the FormDesigner 402, are 3.sup.rd party software systems imported into a design such as by dragging from the Toolbox 403, or are Descriptions 306, 314 provided by Adapters as will be described below.

Figure 15:
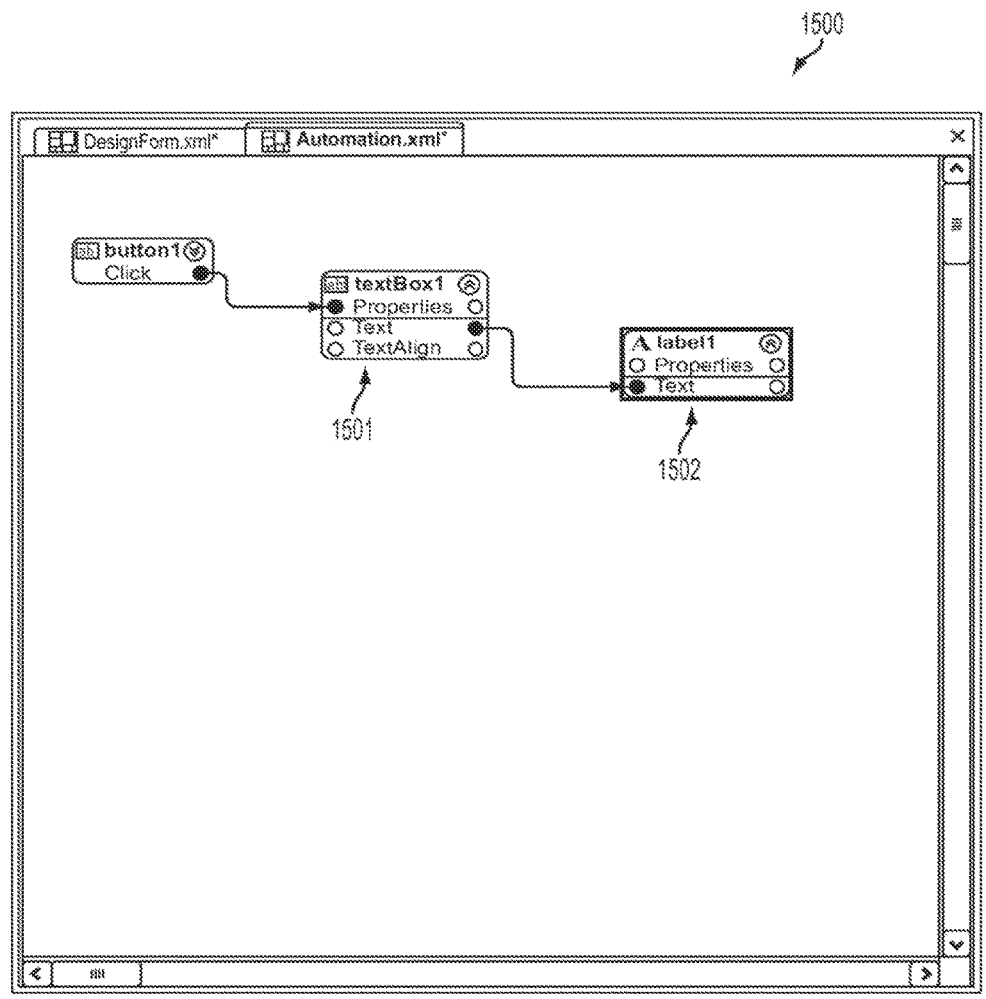
FIG. 15 is a screen shot, illustrating a graphical User Defined Algorithm of the exemplary embodiment of the invention.

FIG. 15 illustrates a screen 1500 in which the Automation Designer 307 of the preferred embodiment allows a user to graphically construct algorithms.

Figure 16:
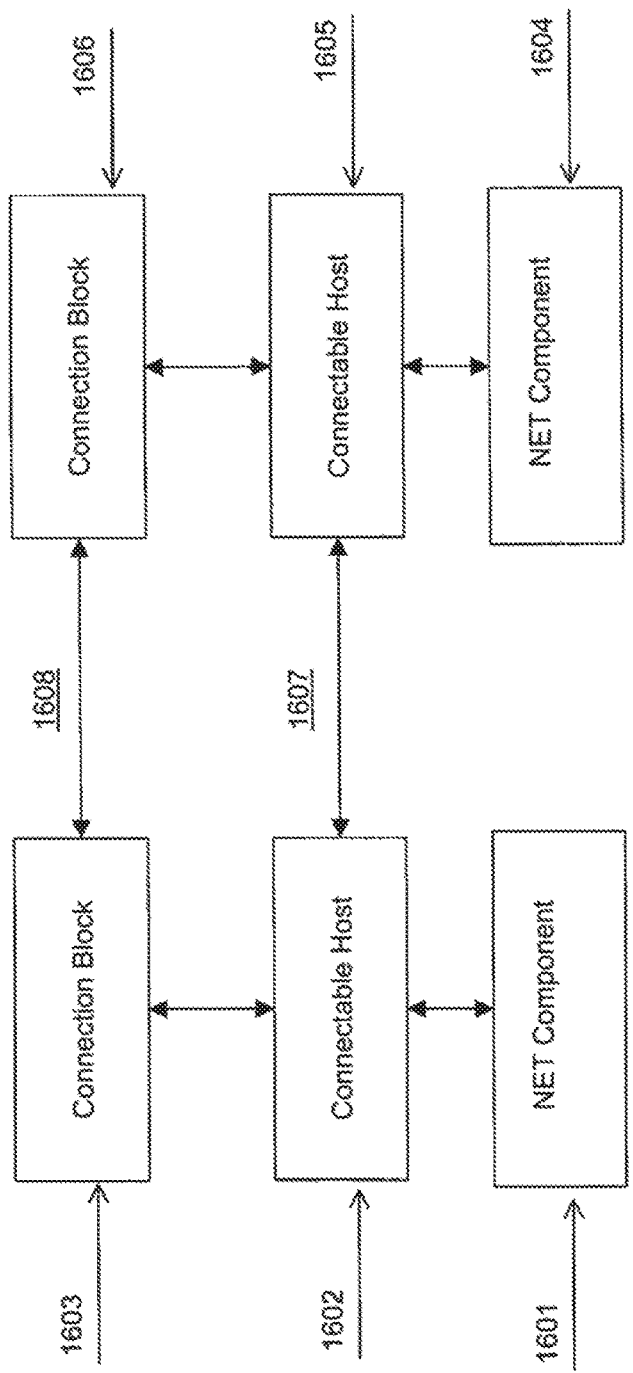
FIG. 16 is a block diagram of the Automation system in accordance with the exemplary embodiment of the invention.

FIG. 16 is a conceptual illustration of objects of the Automation system. The Connectable Host 1602, 1605 hosts a type member of the .NET Component 1601, 1604. Connectable Hosts are responsible for invoking or handling the action the component's type member implements. The visual representation of Connectable Host on the Automation Designer 1500 is provided by the Connection Block 1603, 1606. During graphical design of an algorithm, a graphical Link 1608, as shown between Connection Block 1501 and Connection Block 1502 as illustrated on the Automation Designer 1500, is made using a conventional drag and drop operation with a mouse. Links are made between "ports" of a Connection Block, which map in a one to one relationship to "fittings" of a Connectable Host. When the Loader 310 loads a new software design for execution, the graphical representations are not created. Interconnections between Connectable Hosts that were constructed by graphical Links are replaced with Runtime Links 1607 that operate using Reflection on Connectable Hosts, and in turn based on the behavior of the Connectable Hosts, on the underlying NET Components.

Connectable Hosts have two types of ports, Control and Data, each which can support both input and output flow. Control ports indicate the flow of operation through a link. The input of a control port is used to notify a Connectable Host to perform the action for which it was designed. The output of control port indicates either that the action for which it was signaled is complete, or is an event generated by the object/member being hosted. Data ports indicate the flow of data through a link. The input of a data port indicates setting a data value, and the output indicates the getting of a data value.

Control Ports are implemented using .NET Delegates for input ports and .NET Events for output ports. Data Ports are implement using .NET Properties or objects that descend from a .NET reflection class.

Each .NET type member has its own Connectable Host implementation that models the type member's operation with its Component and will be described in detail below.

The ConnectableProperties Connectable Host is responsible for managing a set of one or more properties of a NET Component. All types in .NET inherit from a base class with the fully qualified name of System.Object. The System.Object type has a method GetType( ) that returns the System.Type of the object. .NETs reflection capabilities rely on knowing the type of an object, and as demonstrated, the adapter can query the object's Type utilizing this standard organic capability without additional design time knowledge of the selected object.

Utilizing the property name a PropertyInfo object can be attained from the .NET metadata using the reflection API call Type.GetProperties. Each property of a .NET object has a PropertyInfo type that provides access to the framework metadata, as well as the ability to manipulate the property of the object. The present invention uses the following functionality of the PropertyInfo GetType( )—Returns the type of the Property MemberType—The type of this member, such as field, property, method. Will by MemberTypes.Property for a PropertyInfo.

DeclaringType—The type of the object that declares this property.

Name—returns the name of the property, which must be unique and is used to identify the property within the Adapter designer.

CanRead—returns whether the value of the property can be read from the object.

CanWrite—returns whether the value of the property can be set on the object.

GetValue—a method that returns the value of the property given a particular object instance.

SetValue—a method that returns the value of the property given a particular object instance.

Data ports are connected to other data ports using a PropertyLink object. When two data ports are connected, the Adapter designer stores in its object memory source Connectable Host and data port and target Connectable Host and data port. When the PropertyLink object is constructed when loading a solution into runtime memory, it queries the source and object identities and the source and target data port property infos using the data stored during design. (explain further) Thus, without writing source code or the objects implementing any related functionality, the PropertyLink has been able to capture the objects and the PropertyInfos that define the movement of data between the properties of two objects. This process is repeated for every link in the algorithm. A data port may have multiple links, and a ConnectableProperties Connectable Host may host multiple properties from the same object.

Figure 17:
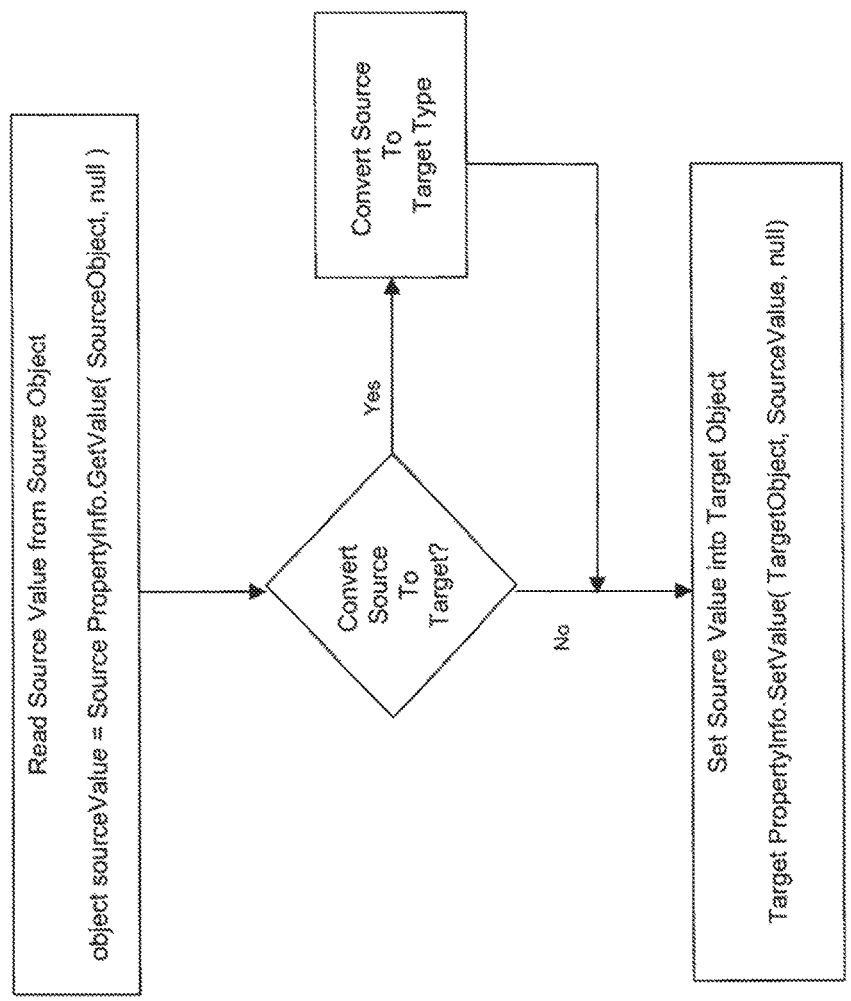
FIG. 17 is a flowchart illustrating the Data Link algorithm of the exemplary embodiment of the invention.
Figure 18:
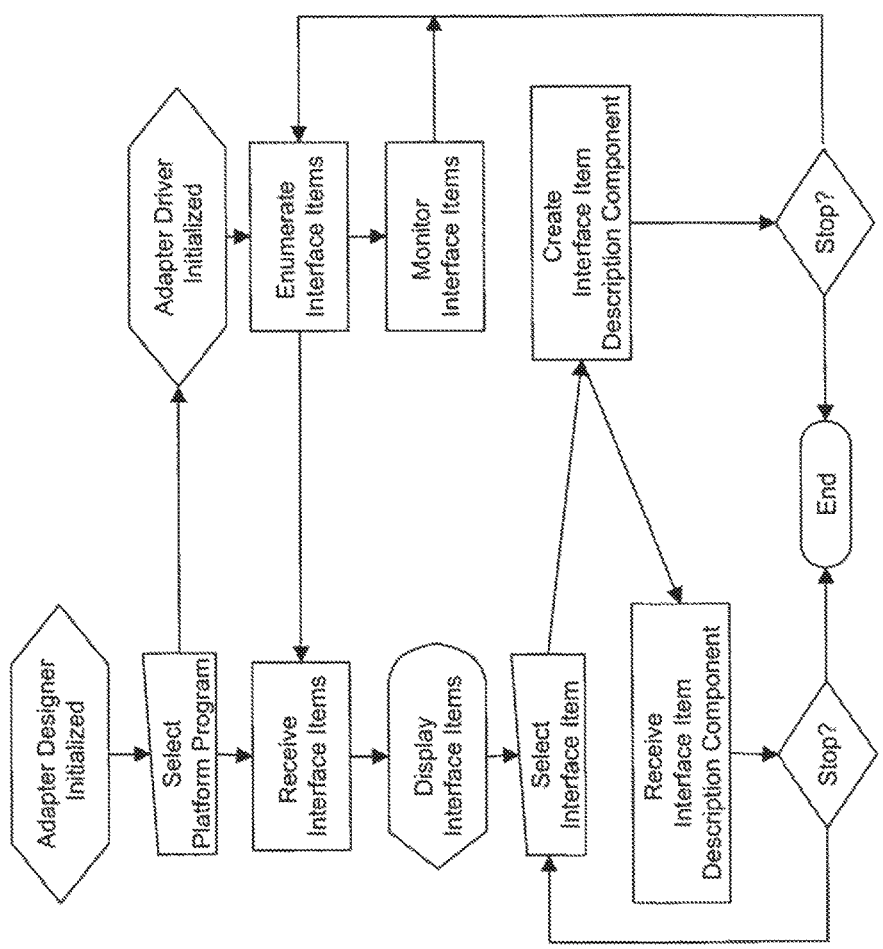
FIG. 18 is a flowchart illustrating the generalized flow and interactions between an Adapter Designer and Adapter Driver in accordance with the exemplary embodiment of the invention.

FIG. 17 illustrates the logic contained in the PropertyLink's Propagate method that uses the object instances and PropertyInfos to get a property's value from the source object, and set this value into the property on the target object. The method firsts reads the value from the source object using the source PropertyInfo and its GetValue method. It then compares the source property's type and the target property's type to determine is a type conversion is required. If the type conversion is required, the source value is converted. An example of a conversion would be converting an integer to a string. Finally, the source value or converted source value is set to the property of the target object using the target Property Info and target object instance.

FIG. 15 illustrates a Connection Block 1501 for the ConnectableProperties host for a Textbox component named "textBox1" and a Connection Block 1502 for the ConnectableProperties host of a Label component named "label1" with a PropertyLink between the output data port for the property named "Text" on the Textbox component, and the input data port for the property named "Text" on the Label component. At Runtime, when the Input Control port is signaled from the button Click event (the behavior of event links and ConnectableEvents to follow), the ConnectableProperties responds to this event by enumerating each of its input data ports and querying whether it has a PropertyLink connected. If a PropertyLink is connected, and if the link is set to "Pull" data, the ConnectableProperties invokes the PropertyLink's Propagate method that was explained above, and the property value will be set into the property of the object instance being hosted. When the enumeration of all Input properties is complete, the output data ports will be enumerated to see if it has PropertyLink connected. If a PropertyLink is connected, and if the link is set to "Push" data, the ConnectableProperties invokes the PropertyLink's Propagate method that was explained above, and the value of the property of the hosted object is read and set into the property of the target object. A link can be set to "Push", "Pull", or both, and is set using the standard IDE Property Grid tool. Once all output data ports have been enumerated, the ConnectableProperties raises its Output Control event to signal its completion with its task.

The ConnectableMethod Connectable Host is responsible for managing a single Method for a .NET Component. Utilizing the method name a MethodInfo object can be attained from the .NET metadata using the reflection API call Type.GetMethod. Each method of a .NET object has a MethodInfo type that provides access to the framework metadata, as well as the ability to manipulate the method of the object. The present invention uses the following functionality of the MethodInfo:

MemberType—The type of this member, such as field, property, method. Will by MemberTypes.Method for a Method info DeclaringType—The type of the object that declares this property.

Name—returns the name of the property, which must be unique and is used to identify the property within the Adapter designer.

GetParameters—Gets an array of ParameterInfos representing each argument of the method call.

Invoke—Calls the method.

ReturnType—a property that returns the type of the value returned from the method. This will be null for void methods.

DeclaringType—the type of the object that declared this member.

The ConnectableMethod uses the MethodInfo.GetParameters call to get a list of parameters used when invoking the method. These parameters are returned as the ParameterInfo type. The present invention uses the following functionality of the ParemeterInfo:

IsIn—property that indicates if the parameter is sent to the method IsOut—property that indicates if the parameter is returned from the method as an 'out' parameter.

IsOptional—property that indicates if the parameter is required for the method invocation.

IsRetVal—property that indicates if the parameter is the Return value of the method.

ParameterType—the type of the parameter value object Name—the Name of the parameter.

Position—the position of the parameter in the parameter list.

As described above, the present invention has functionality for the propagation on PropertyInfos. The PropertyInfo object expects a target or source instance in order to operate. However, by constructing simulated PropertyInfo objects to represent parameters, the PropertyLink functionality can be leveraged. Thus, a ParameterInfo type was created to simulate PropertyInfo's of a method. Whereas each type has a single set of PropertyInfos regardless of the number of object instances, ParameterInfos are created for each parameter of each instantiated connectable method. This is required as there is no valid object instance. In fact, the Get and Set value reflective calls will not be handled by the .Net framework, but will be utilized to store a value directly in object memory of the Parameter info.

Utilizing the ParameterInfo as a simulated PropertyInfo, the ConnectableMethod models a method call as a collection of Properties. Input only Parameters are created as Input only Properties. CanRead returns false. Output only Parameters, such as the Result of a method, are modeled as Output only Properties. CanWrite returns false. Input/Output Parameters are created as Input/Output properties, which is the most standard form of Property. When the ConnectableMethod's Input control port is signaled, it responds by enumerating all its Input data ports and if a PropertyLink exists for that port, has it Propagate its data as described above. This effectively initializes all the method parameters with linkages. It then enumerates all the simulated PropertyInfo objects and builds an array of parameters that matches the method signature as described by the MethodInfo. Next, using its MethodInfo instance, it invokes the method using MethodInfo.Invoke and passing the instance of the hosted object, and the parameter array. If the method has a return value, its simulated PropertyInfo.SetValue is called to set the returned result into the simulated PropertyInfo's object memory. Finally, it enumerates through all Ouput data ports and calls PropertyLink.Propagate for all connected links.

The ConnectableEvent Connectable Host is responsible attaching to an object event and propagating that event to other hosts. Utilizing an event name an EventInfo object can be attained from the .NET metadata using the reflection API call Type.GetEvents. ConnectableEvent gets the method signature of an event's handler by using Reflection to return a MethodInfo for the "Invoke" method from the EventInfo's EventHandlerType property. MethodInfo.GetParameters( ) returns the arguments for the event. ConnectableEvent creates a ParameterInfo object for each parameter to support propagation of arguments through PropertyLinks, in the same way method parameters are simulated and propagated in ConnectableMethod. In addition, if one of the arguments is a subclass of EventArgs, the Reflection API is used to get PropertyInfos of the EventArgs object. This PropertyInfo list is iterated through and a ParameterInfo is created for each property of the EventsArgs object.

In order to attach to an event, ConnectableEvent generates an object with an event handler matching the event signature (.Net Emition is one such way to do this) and passes this object a delegate to the GenericEventReceived method of ConnectableEvent. When the generated event handler receives an event it packages up the event arguments in as an array of objects and calls back into the GenericEventReceived method. GenericEventReceived iterates through all events arguments and sets the value of the corresponding ParameterInfo to the argument value, using Parameter.Info.SetValue( ). Then ConnectableEvent iterates through all the output PropertyLinks and pushes the data for each link, via PropertyLink. Propagate( ). Next the control output event is raised signaling the next ConnectableHost to start its work. At this point Automation execution could have caused the value of an event argument ParameterInfo to be modified, if the argument was an out or ref parameter. An example of this would be an event that has CancelEventArgs. If the Cancel property of Cancel EventArgs is set to true within an event handler the event caller it notified to cancel an operation. In an Automation another ConnectableHost could push a value into an out or ref argument and this value will be sent back to the event caller. So after the control event has been fired the ConnectableEvent iterates through all argument ParameterInfos. If the associated argument is an out or ref the argument value is set to value returned by the Parameter.Info.GetValue( ) method. The GenericEventReceived method returns the modified argument values to the dynamically generated event hander and the event handler returns the modified argument values to the original event caller.

Adapters

Adapters—Background

Adapters utilize the target platform's interface to monitor and automate the target application. Adapters are non-intrusive. The target application does not have to be modified or extended to be operated upon. When monitoring an application, the adapter uses the target platform's interfaces to listen for software system events and changes to the application state. The state of the target application is defined as the list of created objects and their availability for Automation. When objects are created or destroyed, the state of the target application changes. User events are defined as any actions an external "user" performs against an application. For example, when a human operator uses the mouse to click a button within a windows application, a button "click" event occurs. A "user" does not necessarily have to be an actual human operator. For example, if a windows service (such as a virus scan) moves a file, a file "move" event occurs.

When automating an application, the adapter utilizes the target platform's interface to control the target application and its object. In order to control a target application's objects, the adapter utilizes the "description" generated by the designer to identify the application's objects. When a new object is created within the target application, the adapter interrogates the objects properties using the target platform's interfaces. The adapter compares the objects properties against a set of rules captured in the "description". If the object's properties "match" the rules within the description, the component is identified. Once an object is identified, it can be automated using the target platform's interface.

Adapters provide designers that allow users to interrogate the target application and then generate a description of the target application. Designers are non-intrusive. The target application does not have to be modified to be designed against. When interrogating an application, the designer provides a user interface that allows the user to select components within the target application. When the user selects an item within the target application, the designer captures the item's properties and generates a set of rules that uniquely identify the item. The designer creates an automation component for each item selected by the user. The automation component stores the set of rules that uniquely identify the item. The user can modify these rules to make the description "match" additional items.

The automation component also exposes the properties, methods and events that the automation engine will use to manipulate the target item. The automation component also provides synchronization methods and events that allow an application to be deterministically automated without relying on timers or other non-deterministic mechanisms. The methods and events allow a user to control automation flow by waiting for specific component events, such as component lifetime events like created and destroyed, or user input events, such as clicked, key pressed, or text changed.

The designer stores the information it has gathered about the application in the application description. The description will contain information about controlling the target application, such as the application path used to start the application. The description also contains a hierarchy of automation components representing the items the user interrogated. The automation components describe the application, but are not required to exactly reflect the application. Using configurable matching, users can model an application abstractly, so that the automation components can represent more than one target item. Thus, users can describe an application's components by function, category or other models.

The driver is a software element that interacts with the interfaces of the target platform. The driver enables the enumeration of software program instances, the interfaces of said instances, and the items of the said interfaces. The driver enables querying the state of software system instances, the interfaces of said systems, and the items of said interfaces as allowed by the platform. The driver enables control of software programs, and interaction with interfaces of said programs, and items of said interfaces as allowed by platform. The driver enables capturing the events generated by the platform, software program, and its interfaces. The driver monitors software programs of the target platform to detect manage the dynamic lifetimes of particular interface items. The driver works within the scope of the platform and does not require software programs to be either modified or extended.

The designer is a Graphical User Interface that allows a human operator to interrogate a chosen software program built on the Adapters platform and design a functional Description of the target system analogous to an Application Programming Interface. Unwanted interface items can be ignored, or rules can be created to filter items based on their state.

As described above, descriptions are selected interface items and rules. They can be stored as a hierarchical .NET Object graph that can serialize to XML. Each Adapter has .NET types whose User Interface, Properties, Methods, and Events represent a platform interface element(s) provided by the Driver. The NET Description types utilize the Driver to forward any manipulation of a NET Description instance to the corresponding target software program's interface item. Likewise, any change to the state of a target program's interface item is propagated to the .NET Description instance via the Driver.

Example—.NET Component Adapter

The following is a detailed description of the .NET Component Adapter. The .NET Component Adapter enables types from the .NET Framework that implement the System.ComponentModel.IComponent interface to be imported and utilized in new software solutions. The types are not modified or extended. Interoperability with the types is provided by the Adapter Driver that is written against the functionality of the .NET Framework, and specifically the .NET Common Language Runtime (CLR). The CLR is the core runtime engine for the NET Framework.

.NET Component Adapter Driver

The .NET Component Adapter Driver is constructed in response to the dragging and dropping of one or more Properties from the Object Inspector 503 onto the Automation design surface 504. When constructed, it stores in its object memory the identity of the object selected from the Object Explorer 503 (need to reference the object explorer different from object inspector) as well as the selected properties from the Object Inspector 503. The .NET Component Adapter Driver provides enumeration and manipulation capabilities for .NET Components. The Driver is configured by giving it an instance of a target Component. This Component may come from an existing software application, or may be a Component under construction within the Composite Studio IDE.

Components may be containers of additional child components, and so on, such that a hierarchical view to an arbitrary and indefinite level is possible. Each property or field of the Component that implements System.ComponentModel.IContainer can be enumerated to produce additional Component instances. For example, typical .NET Components includes a private field named "components" that is a Container. Generally, private members are not utilized by the present invention.

.NET Controls are Components that provide a visual interface. All .NET Controls have a property named "Controls" that is a System.Windows.Forms.Control+ControlCollection. The value of "Controls" can be enumerated to produce additional Component instances.

Either iterative or recursive enumeration, both conventional, is utilized to produce a complete hierarchical view of available component instances given an initial top-level instance. The Automation Connectable Hosts and Runtime Links satisfy the interaction elements of the .NET Component Adapter Driver.

.NET Component Adapter Designer

Figure 19:
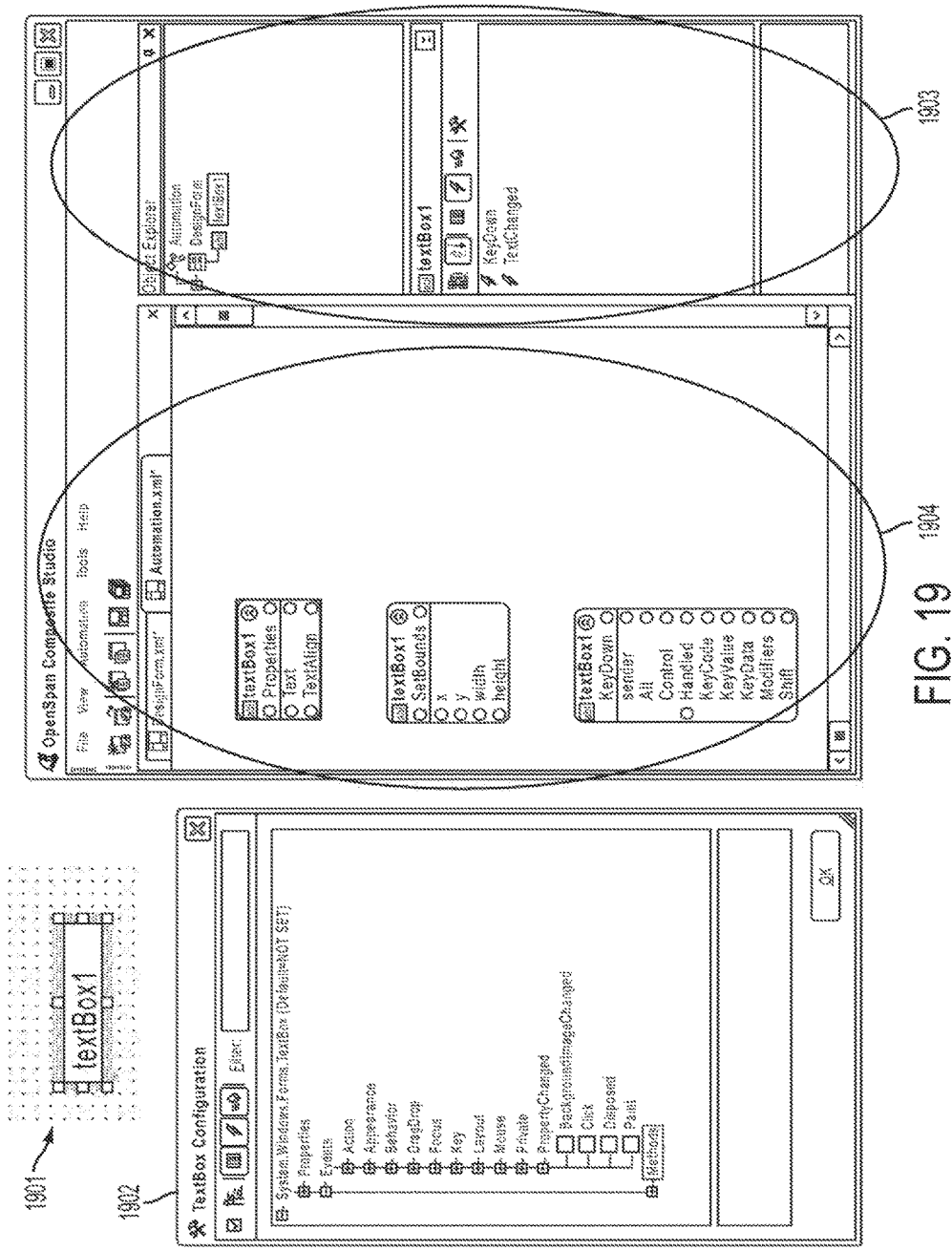
FIG. 19 is a screen shot, illustrating a .NET Component Adapter Designer of the exemplary embodiment of the present invention.

FIG. 19 illustrates the .Net Component Adapter Designer of the exemplary embodiment. The Control designer 1901 shows the rendering of the User Interface of a .NET visual control type design. Because all attributes of the visual representation of a .NET Control are available through its Property, Method, and Event interface members, the .NET Component adapter does not use the User Interface. The Type Configurator 1902 shows a hierarchical tree view of the members of a .NET type. Because NET types may have hundreds of interface members, the Type Configurator 1902 allows for filtering which members are available for manipulation within the Adapter Designer 1904. Since .NET maintains the metadata tables of type members, the Type Configurator 1902 only needs to maintain a dictionary of members that have been selected for use for each type. This is done in the Type Dictionary.

FIG. 20 shows the Type Dictionary XML document utilizing the fully qualified type name used in the preferred embodiment though one skilled in the art will recognize that there are many techniques and storage medium for hierarchical data.

Referring again to FIG. 19, the Object Inspector 1903 shows two panes. The Object Explorer is a hierarchical view of all .NET objects in the solution that is enumerable using the container implemented by the top level Design Component. When an object is selected, the Object Inspector shows the interface members for that object that have been enabled through the Type Configurator 1902.

Example—Windows Adapter

The following is a detailed description of the Windows Adapter. The Windows Adapter enables elements from a software system built in accordance with the Windows platform to be imported and utilized in new software solutions. The elements are not modified or extended. Interoperability with the elements is provided by the Adapter Driver that is written against the functionality of the Windows platform.

Windows Platform Overview

The Microsoft Windows operating system provides users a graphical interface that is manipulated by a mouse and keyboard. Applications define a hierarchy of windows that are rendered by the operating system to provide the user interface. Windows provides a interface to manipulate the user interface programmatically. The Windows adapter uses this interface to monitor and automate applications on the 32 bit and 64 bit versions of Windows. Every user interface item, whether it is a dialog or a button is technically considered a window. Typically however, top level windows (forms, dialogs) are referred to as windows and their children (buttons, textboxes, etc.) are referred to as controls.

The Windows platform provides two mechanisms to interact with windows and controls: functions and messages. Functions are typically utilized by an application to create and manipulate its windows and controls. For example, the CreateWindowEx function creates a new window or control and adds it to the window hierarchy. Messages are used by the operating system to notify applications of events. Messages are sent to individual windows and controls when the system or the user interacts with the control. For example, after a new window or control is created using the CreateWindowEx function it receives a WM_CREATE message before it is shown. It then receives a WM_SHOWWINDOW message when it is shown or hidden on the screen. Finally when a window is destroyed it receives the WM_DESTROY message before it destroyed by the operating system.

Each application thread has a message loop that processes messages as they arrive from the operating system and then calls the message processing function (WndProc) on the appropriate window or control. The Windows platform provides hooks that allow external applications to monitor the messages going to a target application thread. Windows hooks can be installed globally to monitor all messages within the system or locally to monitor messages going to particular application threads.

Windows Adapter Driver

The Windows adapter driver consists of three layers. The lowest layer is the native hook layer, which is loaded into the target application using windows hooks. The native hook layer filters messages going to and from the target application, and forwards certain messages to the monitor layer for processing. The monitor layer consists of a receiver that processes messages forwarded from the native hook layer and a matching engine that identifies windows based on the rules stored in the automation components. The monitor layer also forwards messages to the appropriate automation components once they are processed. The automation layer consists of the hierarchy of automation components identified during the interrogation.

The native hook layer is a DLL that implements two functions. The CallWndProc function intercepts messages that are sent to the target WhndProc. The GetMessageProc function intercepts messages that are posted to the target WhndProc. Each function contains logic to handle each different type of message received. Some messages are always forwarded to the monitor layer, while some messages are only forwarded to the monitor layer if the monitor layer has expressed interested in the window or control receiving the message. The native hook layer also maintains a timer that is reset each time a new message is received. When a pre-configured amount of time elapses between messages the native hook layer sends a custom message, WM_MESSAGE_BREAK, to the monitor layer.

The monitor layer receives messages from the native hook layer and monitors the application state. The monitor layer maintains a hierarchy of proxy objects that mirror the hierarchy of windows and controls within the target application. When the monitor receives a WM_CREATE message from the native hook layer, the monitor adds the message to a queue for processing. When the monitor receives a WM_MESSAGEBREAK message from the hook layer, it processes the messages in the queue to update the proxy object hierarchy. The WM_MESSAGE_BREAK message indicates that the target application has been idle for the pre-configured amount of time and its state should be refreshed. As proxy objects are added to the hierarchy, the monitor maintains a list of the top-level proxy objects that have been created. Top-level proxy objects are either windows that may or may not have a parent, or controls that have a parent that is already identified.

After the queue is emptied, the monitor iterates over the list of top-level proxy objects and identifies them based on the description stored in the automation layer. Identification consists of the following steps. For each top-level proxy object the monitor determines whether the native item the proxy object represents is visible or hidden. Hidden items are ignored during matching. If an item is visible, the monitor then determines if the item has a parent that is identified. If the item has a parent that is identified, the monitor iterates the children of the automation component and matches the automation components to the appropriate items. If the item does not have a parent, the monitor iterates the top-level automation components and matches them to the appropriate items. In the preferred embodiment, there is a one-to-one correspondence between automation components and windows and controls. Thus, if an automation component is already matched it is skipped during iteration.

However, there does not have to be a one-to-one correspondence if the automation component contains logic that allows it to operate on more that one item simultaneously or to choose what matched item to operate on. For example, an application may contain three MDI child windows which are identical in their construction but represent a different record within the application. The automation component could be instructed to operate on only the focused MDI child window or on the MDI child window that represents a particular record.

Within a Windows application, windows and controls are identified by a handle. Handles are integers that are unique during each run of the application. Handles are not unique between runs of the application. Thus, during each run of the target application, the windows and controls comprising the application are different, although the structure of the hierarchy is mostly, although not always, the same. Each automation component contains a set of match rules that uniquely identify the window or control the automation component corresponds to. Match rules can utilize any piece of information available through the platform interface to identify the window or control. Examples include text, position, size, control id, creation sequence, class name, and real class name. Each match rule contains the expected value to compare against the actual value of a window or item. Comparisons do not have to be exact. For example, a text match rule may utilize substrings, wild cards, or a regular expression to match a window or control. During matching, each automation component compares its match rules to the window or control. If all of the match rules match, the window or control is considered identified and the automation component is considered "created". The identification process can be triggered by messages other than WM_CREATE such as WM_SHOWWINDOW or WM_ACTIVATE. Thus, automation component "creation" does not refer to the actual creation of the target window or control, but rather the point at which the target window or control is identified and available for automation.

When an automation component is matched, the monitor layer notifies the native hook layer that the window or control is matched. The native hook layer stores the handle representing the window or control and uses the handle to filter messages. When the monitor receives a filtered message from the native hook layer, it will look up the corresponding automation component in the proxy hierarchy and forward the message to the automation component for processing. When the monitor receives the WM_DESTROY messages, it looks up the appropriate proxy object by handle. If the window or control is matched, the monitor notifies the appropriate automation component that it is being destroyed. It then removes the proxy object from the hierarchy.

The automation layer consists of a hierarchy of components that "describe" the target application. Although the automation layer describes the target application, it is not an exact reflection of the target application. It consists of the automation components that identify windows and controls the user is interested in. It thus describes a subset of the application that the user intends to automate against. As described previously in the MDI child example, automation components can represent more than one window or control. Another example of this principle might be a set of error dialogs, which are identical but for the error messages they display. A single automation component can be configured so that its match rules identify all of the error dialogs. In this manner, the user can create a new construct, "the error dialog," that describes all possible error dialogs within the target application. Thus, the automation layer provides a mechanism that allows the user to describe an application's windows and controls abstractly.

When an automation component is identified, it raises a "created" event. Internally, an automation component contains two manual reset events, one for creation and one for destruction. Manual reset events are Windows threading mechanisms that other threads can use to wait for certain events to occur. In the preferred embodiment, the monitor layer runs in a separate thread from the automation layer. When an automation component is matched, the creation reset event is set. If another thread is waiting on the creation event it is allowed to continue. The automation component exposes a WaitForCreate method that allows the automation thread to wait for the create event before proceeding. In this manner, a user can create an automation that deterministically proceeds through a series of windows without resorting to manual timers or other non-deterministic mechanisms. This pattern can be extended to other messages as well. For example, an automation could navigate the user through a series of screens until a specific dialog is displayed. In this example, the dialog requires a password textbox and an "OK" button. The user must input their password before proceeding. The automation can wait upon a manual reset event that is triggered when the automation component representing the "OK" button receives a BN_CLICKED notification in response to the user clicking the actual "OK" button. When the automation component receives the notification, it will set the manual reset event, allowing the automation to proceed and continue to navigating the application.

As mentioned above, when an automation component is matched, the monitor layer forwards messages to the automation component for processing. The automation component may raise events in response to messages or may update its internal state. Automation components process messages on the monitor thread which allows automation components to choose whether the target application can process a message immediately by raising events asynchronously so that they start a new thread or synchronously so that the target application blocks until the automation finishes processing. Automation components also provide methods and properties that use the platform interface to manipulate the matched window or control. Within the property or method, the automation component encapsulates the logic necessary to manipulate the target control. In this manner, the automation component can abstract implementation differences from the user of the system. Thus although the windows adapter and the web adapter use different mechanisms to "click" a button, the user can use the "click" method of both components in the same manner.

Windows Adapter Designer

A windows adapter designer comprises a .NET designer build upon the .NET designer framework that exposes an interrogator to inspect the target application, a component library to view and edit the interrogated automation components and a match rule editor to edit the match rules of a component. FIG. 7 shows a screen 700 illustrating an example of an adapter designer 701 containing an interrogator 703, control library 705 and match rule editor 706. The interrogator is a .NET windows form that contains a single picture box control. When the user holds the mouse down over the picture box control, the control captures the mouse. In the windows operating system, when a control has captured the mouse it continues to receive mouse events even when the mouse is dragged off of the control. Holding the mouse down, the user can drag the mouse over any window or control in the target application. When the mouse is over a control the designer highlights the control within the target application using GDI drawing functions. When the user releases the mouse button, the interrogator captures the controls information and passes it to the control factory service.

The control factory service is a .NET service that is added to adapter site by the designer. The control factory service is responsible for creating new automation components based on the properties of the selected item. Depending on the class name and real class name of the control, the control factory creates the appropriate automation component, such as a button, textbox or form. The control factory then adds a default set of match rules determined by the type of the automation component. Each match rule determines its default value by inspecting the target item using the platform interface. After the automation component is created, the control factory determines if it needs to create a parent for the component based on whether the target item's parent is matched. The control factory continues recursively up the tree of items until a matched parent is found or it encounters a top-level item.

The component library consists of a .NET tree view that displays the hierarchy of automation components. Each component is displayed with an icon representing its type. Users can right click or press the delete button to delete a component from the hierarchy. When a new component is created using the interrogator, the tree view refreshes to display the new component. When a component is selected within the tree view, the properties of the component are displayed in the IDE property grid and the contents of the match rules are displayed in the match rule editor. During interrogation, each node in the tree view also displays an indicator when a component is successfully matched in the target application.

The match rule editor displays the set of match rules configured for a specific component when it is selected in the component library. In the exemplary adapter designer 701, match rule editor 706 includes a match rule list 707 and a drop-down list of available match rules 708. Users can right click or press the delete button to delete a component from the match rule list. A drop-down list displays the match rules that are available for each type of component. The available match rules are determined by attributes applied to the match rule classes. Users can select a match rule type from the drop-down list and press the "Add" button to add a new match rule. When a match rule is selected in the match rule list, its properties are displayed in an additional property grid that is part of the match rule editor. Users can edit the match rule properties to change the behavior of the match rules. The match rule editor also contains a list box that displays the list of native items that match a specific automation component during interrogation. It also contains an "Interrogate" button that launches the interrogator form. As before, the user can use the interrogator to select an item within the target application. When the user selects a target item, the match rule editor updates the match rule list to display icons indicating which match rules succeeded or failed to match the target item. The user can then edit the match rules to achieve the desired result.

Designs

Software solutions or designs 309 (FIG. 3) that are built in accordance with the illustrated embodiment of the invention are persisted as XML documents, though one ordinarily skilled in the art will recognize that generating source code, or serializing into other formats will achieve an equivalent result. XML is an industry standard markup language. The XML documents can be written to any suitable storage media, such as hard disks, web servers, and document management systems. (E.g., disk 106 in FIG. 1.)

Design Components are persisted using serialization. Serialization is the process of saving an object onto a storage medium, and is well understood by persons skilled in the art. The content of a serialized Design Component is analogous to a netlist that is created by Electronic CAD tools.

Component Instances define an instance of a particular type, and the values of the properties of this particular instance. Components may also be containers, and contain a hierarchy of other components to an arbitrary level. The object graph may be flat, rather than hierarchical.

References define components that are defined in detail in external sources. For every reference, a component instance will exist in the object graph that is of the Reference type.

Most Designs either contain or reference descriptions of components used. Each time a component is used in a Design, this is called an "instance". Thus, each instance has a "master", or "definition". These definitions will usually list the connections that can be made to that kind of device, and some basic properties of that device. These connection points are called "ports" or "pins", among several other names.

In large designs, it is a common practice to split the design into pieces, each piece becoming a "definition" which can be used as instances in the design. A definition which includes no instances would be referred to as "primitive", or "leaf", among other names; and a definition which includes instances would be "hierarchical". A "folded" hierarchy allows a single definition to be represented several times by instances. An "unfolded" hierarchy will not allow a definition to be used more than once in the hierarchy. Folded Hierarchies can be extremely compact. A small Design (for instance, just a few hundred instances) could describe connections with tens or hundreds of thousands of instances this way. How? Let's suppose definition "A" is a simple primitive memory cell. Further suppose that definition "B" contains 32 instances of "A". Further suppose definition "C" contains 32 instances of "B". Further suppose "D" contains 32 instances of "C", and "E" contains 32 instances of "D". At this point, the design contains a total of 5 definitions (A through E), and 128 total instances. Yet, E describes a circuit that contains 1,048,576 instances of "A"! A "Flat" design is one where only instances of primitives are allowed. Hierarchical designs can be "exploded" or "flattened" into flat designs via recursive algorithms. "Explosion" can be a very apt term if the design was highly folded (as in the previous example). Also, folded designs can be "unfolded", by creating a new copy (with a new name) of each definition each time it is used. This will generate a much larger database if the design was highly folded, but will also preserve the hierarchy.

By providing a list of the instance names as one descends a folded hierarchy from the top definition to the primitives, one can derive a unique hierarchical path to any instance. These paths can be used to tie a flat design description to a folded hierarchical version of the same design. A Unique Component Identity can be derived from the unique hierarchical path. A Unique Component Identity is critical to making connections between the ports of components at runtime when loading a Design.

Another concept often used in netlists is that of inheritance. Suppose a definition of a component has an associated property called Size with a default value of "100". Each instance of this component might also have such an property, only with a different value of Size. And other instances might not associate any Size at all. In the case where no capacitance is specified for an instance, the instance will "inherit" the 100 value from its definition. A value specified will "override" the value on the definition. If a great number of properties end up being the same as on the definition, a great amount of information can be "inherited", and not have to be redundantly specified in the Design, saving space, and making the design easier to read by both machines and people.

FIG. 21 illustrates the content of an XML design document of a simple .NET Form.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for visual software development implemented in a computer system comprising a processor adapted to execute program instructions stored in a memory, a memory adapted to store program instructions that are executable by the processor, and program instructions stored in the memory and executable by the processor to perform the method comprising:

generating, by a first adapter, descriptions for a first software system, the first software system built in accordance with a first platform of a plurality of software platforms, the first adapter being associated with the same software platform as the first software system, the first adapter interrogating at least one element of the first software system utilizing the first platform and generating at least one description corresponding to an element of the first software system without altering or extending the first software system, the at least one description including a set of rules, the first adapter having a user interface to initiate interrogation when a new object is created within an element of the first software system, the first adapter interrogating properties of the new object, comparing the properties of the new object against the set of rules of the at least one description to determine whether there is a match, in response to the properties of the new object matching the set of rules, identifying the new object, and in response to the new object being identified, controlling the identified object;

receiving, at a user interface of an integrated development environment (IDE) to build a design using the descriptions, graphically selected descriptions and created interconnections of a design, the design comprising user-selected descriptions and the interconnections between descriptions and graphical icons representing the user selected descriptions and interconnections, the user-selected descriptions and interconnections together defining a user-defined algorithm; and enabling the user-defined algorithm to be effected in response to the user-selected descriptions and interconnections.

2. The method of claim 1, wherein the first adapter is further adapted to provide a designer having a user interface to select an element of the first software system, to generate the set of rules included in the at least one description for each selected element, the set of rules identifying the selected element, and to create an automation component for each selected element storing the set of rules.

3. The method of claim 2, wherein each automation component is adapted to expose at least one of properties, methods, and events to be used to manipulate the corresponding element of the first software system.

4. The method of claim 3, wherein each automation component is further adapted to provide synchronization methods and events to deterministically control the first software system without using timers or other non-deterministic mechanisms.

5. The method of claim 1, further comprising interacting, by a driver, with interfaces of the first software system, to enumerate instances of elements of the first software system, the interfaces of the instances, and the items of the interfaces of the instances.

6. The method of claim 5, wherein the driver is further adapted to control the first software system, the interaction with the interfaces of the first software system, and the items of the interfaces of the first software system, and to capture events generated by the first software system.

7. A visual software development system, comprising:

a processor adapted to execute program instructions stored in a memory, a memory adapted to store program instructions that are executable by the processor, and program instructions stored in the memory and executable by the processor to implement:

a first adapter adapted to generate descriptions for a first software system, the first software system built in accordance with a first platform of a plurality of software platforms, the first adapter being associated with the same software platform as the first software system, the first adapter interrogating at least one element of the first software system utilizing the first platform and generating at least one description corresponding to an element of the first software system without altering or extending the first software system, the at least one description including a set of rules, the first adapter having a user interface to initiate interrogation when a new object is created within an element of the first software system, the first adapter adapted to interrogate properties of the new object, to compare the properties of the new object against the set of rules of the at least one description to determine whether there is a match, when the properties of the new object match the set of rules, to identify the new object, and when the new object is identified, to control the identified object;

an integrated development environment (IDE) adapted to build a design using the descriptions, the IDE having a user interface adapted to graphically select descriptions and create interconnections of the design, the design comprising user-selected descriptions and the interconnections between descriptions and graphical icons representing the user selected descriptions and interconnections, the user-selected descriptions and interconnections together defining a user-defined algorithm; and a loader adapted to enable the user-defined algorithm to be effected in response to the user-selected descriptions and interconnections.

8. The visual software development system of claim 7, wherein the first adapter is further adapted to provide a designer having a user interface to select an element of the first software system, to generate the set of rules included in the at least one description for each selected element, the set of rules identifying the selected element, and to create an automation component for each selected element storing the set of rules.

9. The visual software development system of claim 8, wherein each automation component is adapted to expose at least one of properties, methods, and events to be used to manipulate the corresponding element of the first software system.

10. The visual software development system of claim 9, wherein each automation component is further adapted to provide synchronization methods and events to deterministically control the first software system without using timers or other non-deterministic mechanisms.

11. The visual software development system of claim 7, further comprising at least one driver adapted to interact with interfaces of the first software system, to enumerate instances of elements of the first software system, the interfaces of the instances, and the items of the interfaces of the instances.

12. The visual software development system of claim 11, wherein the driver is further adapted to control the first software system, the interaction with the interfaces of the first software system, and the items of the interfaces of the first software system, and to capture events generated by the first software system.

13. A computer program product for visual software development comprising a computer readable non-transitory storage medium having computer-executable instructions stored thereon, the computer-executable instructions executable by a computer system comprising a processor adapted to execute program instructions stored in a memory, a memory adapted to store program instructions that are executable by the processor, and program instructions stored in the memory and executable by the processor to perform:
generating, by a first adapter, descriptions for a first software system, the first software system built in accordance with a first platform of a plurality of software platforms, the first adapter being associated with the same software platform as the first software system, the first adapter interrogating at least one element of the first software system utilizing the first platform and generating at least one description corresponding to an element of the first software system without altering or extending the first software system, the at least one description including a set of rules, the first adapter having a user interface to initiate interrogation when a new object is created within an element of the first software system, the first adapter interrogating properties of the new object, comparing the properties of the new object against the set of rules of the at least one description to determine whether there is a match, when the properties of the new object match the set of rules, identifying the new object, and when the new object is identified, controlling the identified object;
receiving, at a user interface of an integrated development environment (IDE) to build a design using the descriptions, graphically selected descriptions and created interconnections of a design, the design comprising user-selected descriptions and the interconnections between descriptions and graphical icons representing the user selected descriptions and interconnections, the user-selected descriptions and interconnections together defining a user-defined algorithm; and
enabling the user-defined algorithm to be effected in response to the user-selected descriptions and interconnections.

14. The computer program product of claim 13, wherein the first adapter is further adapted to provide a designer having a user interface to select an element of the first software system, to generate the set of rules included in the at least one description for each selected element, the set of rules identifying the selected element, and to create an automation component for each selected element storing the set of rules.

15. The computer program product of claim 14, wherein each automation component is adapted to expose at least one of properties, methods, and events to be used to manipulate the corresponding element of the first software system.

16. The computer program product of claim 15, wherein each automation component is further adapted to provide synchronization methods and events to deterministically control the first software system without using timers or other non-deterministic mechanisms.

17. The computer program product of claim 13, further comprising interacting, by a driver, with interfaces of the first software system, to enumerate instances of elements of the first software system, the interfaces of the instances, and the items of the interfaces of the instances.

18. The computer program product of claim 17, wherein the driver is further adapted to control the first software system, the interaction with the interfaces of the first software system, and the items of the interfaces of the first software system, and to capture events generated by the first software system.

* * * * *